US012720659B2

(12) United States Patent
Cohen et al.

(10) Patent No.: US 12,720,659 B2
(45) Date of Patent: Aug. 25, 2026

(54) METHOD AND ARRANGEMENTS FOR MULTI-CHANNEL CONTROL

(71) Applicant: Leviton Manufacturing Co., Inc., Melville, NY (US)

(72) Inventors: Kyle Cohen, Wantagh, NY (US); William Grande, Valley Cottage, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 507 days.

(21) Appl. No.: 18/195,047

(22) Filed: May 9, 2023

(65) Prior Publication Data

US 2023/0276556 A1 Aug. 31, 2023

Related U.S. Application Data

(62) Division of application No. 16/980,980, filed as application No. PCT/US2020/049815 on Sep. 9, 2020, now Pat. No. 11,683,874.

(Continued)

(51) Int. Cl.
*H05B 47/10* (2020.01)
*H05B 45/325* (2020.01)
(Continued)

(52) U.S. Cl.
CPC ........... *H05B 47/16* (2020.01); *H05B 45/325* (2020.01); *H05B 47/11* (2020.01); *H05B 47/19* (2020.01); *H05B 47/196* (2024.01)

(58) Field of Classification Search
CPC ...... H05B 45/10; H05B 45/30; H05B 45/325; H05B 47/10; H05B 47/11; H05B 47/16; H05B 47/19; H05B 47/196
See application file for complete search history.

(56) References Cited

U.S. PATENT DOCUMENTS 8,289,716 B2 10/2012 Patel et al.
10,568,179 B2 2/2020 Anthony et al.
(Continued)

FOREIGN PATENT DOCUMENTS

WO 2019133108 A1 4/2019

OTHER PUBLICATIONS

Author Unknown., "Sapphire™ Room Controller: Customizable lighting, color tuning and scheduling" 2018—Leviton Manufacturing Co., Inc., 4 pages.

(Continued)

*Primary Examiner* — Jimmy T Vu
(74) *Attorney, Agent, or Firm* — KDW Firm PLLC

(57) ABSTRACT

A device having a memory to store a setting for a load; an actuator to connect power to or disconnect power from the load; a user input device to adjust a first attribute of the load; a wireless communication interface to receive the setting; and a controller to generate a first control signal to set the first attribute and a second control signal to set a second attribute based on adjustment of the first attribute and the setting. A method for determining a first event, the first event associated with a first trigger and a first action; determining to perform the action associated with the first event in response to occurrence of the first trigger; generating a first control signal based on a user input; and generating a second control signal based on a relationship between the first and the second control signals. A method to program a switch.

20 Claims, 9 Drawing Sheets

Related U.S. Application Data

(60) Provisional application No. 62/898,071, filed on Sep. 10, 2019.

(51) Int. Cl.

| | |
|---|---|
| ***H05B 47/11*** | (2020.01) |
| ***H05B 47/16*** | (2020.01) |
| ***H05B 47/175*** | (2020.01) |
| ***H05B 47/19*** | (2020.01) |

(56) References Cited

U.S. PATENT DOCUMENTS

| | | | | |
|---|---|---|---|---|
| 10,645,777 | B2 | 5/2020 | Casey et al. | |
| 2013/0063042 | A1 | 3/2013 | Bora et al. | |
| 2015/0351191 | A1 | 12/2015 | Pope et al. | |
| 2016/0183347 | A1 | 6/2016 | Morrison | |
| 2016/0323972 | A1 | 11/2016 | Bora et al. | |
| 2017/0127485 | A1 * | 5/2017 | Hsia | H05B 45/60 |
| 2018/0160502 | A1 | 6/2018 | Casey et al. | |
| 2020/0152403 | A1 | 5/2020 | Shi | |
| 2020/0221552 | A1 | 7/2020 | Casey et al. | |
| 2021/0227661 | A1 * | 7/2021 | Antony | H05B 45/345 |

OTHER PUBLICATIONS

Author Unknown., "Daily activity lighting: Philips Hue" Philips—retrieved Sep. 2, 2020—URL: https://www.philips-hue.com/en-us/daily-activity-lighting#products 11 pages.

Author Unknown., "Sapphire™ Room Controller: Precise LED output color tuning capabilities for user satisfaction" 2018—Leviton Manufacturing Co., Inc., 2 pages.

Author Unknown., "Color Tuning with Lutron Controls" Lutron—May 2017 12 pages.

International Search Report and Written Opinion for the International Patent Application No. PCT/US20/49815, mailed Dec. 3, 2020, 12 pages.

* cited by examiner

FIG. 1E

1400

| PROCESSING DEVICE DATA STRUCTURE (PROGRAM) |
| --- |
| SWITCH ID, EVENT, ON/OFF, INTENSITY, COLOR, RELATIONSHIP |
| SWITCH ID, EVENT, ON/OFF, INTENSITY, COLOR, RELATIONSHIP |
| SWITCH ID, EVENT, ON/OFF, INTENSITY, COLOR, RELATIONSHIP |
| ⋮ |

FIG. 1F

1500

| SWITCH DATA STRUCTURE (PROGRAM) |
| --- |
| (1) EVENT, ON/OFF, INTENSITY, COLOR, RELATIONSHIP |
| (2) EVENT, ON/OFF, INTENSITY, COLOR, RELATIONSHIP |
| (3) EVENT, ON/OFF, INTENSITY, COLOR, RELATIONSHIP |
| ⋮ |

FIG. 1G

1600

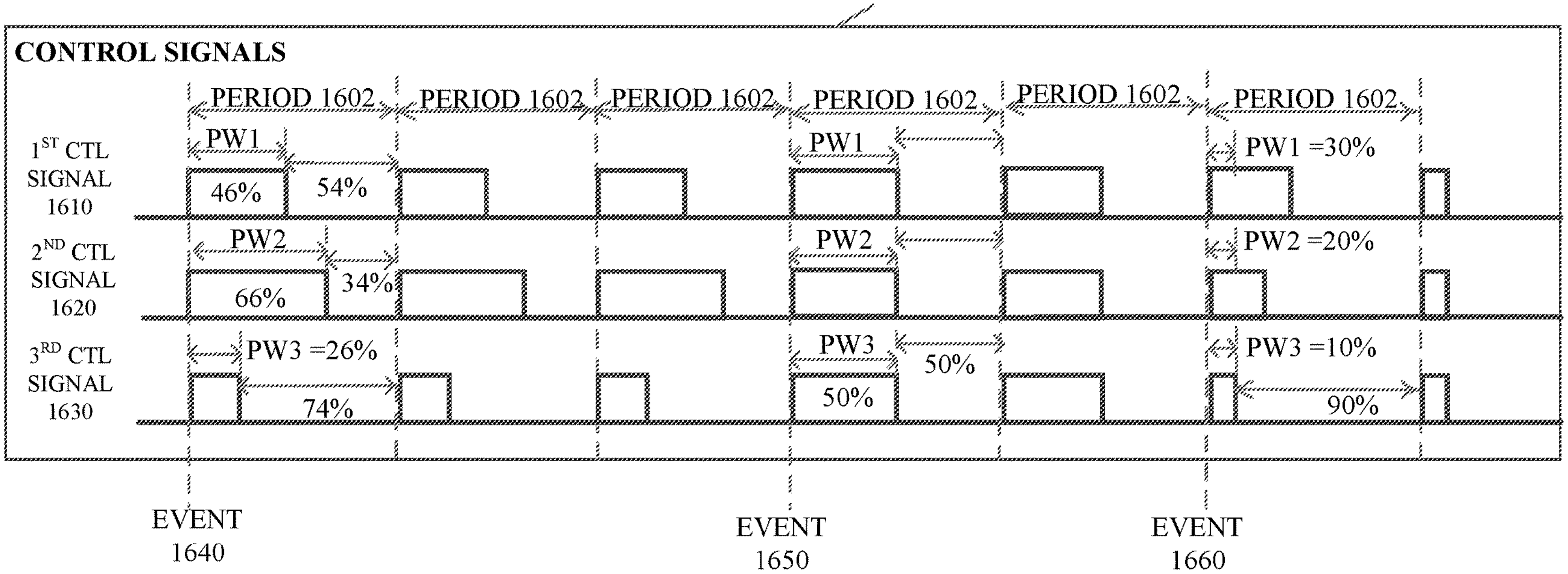

METHOD AND ARRANGEMENTS FOR MULTI-CHANNEL CONTROL

CROSS-REFERENCE TO RELATED APPLICATIONS

This application is a divisional of, claims the benefit of and priority to previously filed U.S. patent application Ser. No. 16/980,980, filed Sep. 15, 2020, entitled "METHODS AND ARRANGEMENTS FOR MULTI-CHANNEL CONTROL", which is a United States National Phase filing of International Application No. PCT/US2020/049815, filed Sep. 9, 2020, entitled "METHODS AND ARRANGEMENTS FOR MULTI-CHANNEL CONTROL", which claims the benefit of U.S. Provisional Application Ser. No. 62/898,071, filed Sep. 10, 2019, entitled "METHODS AND ARRANGEMENTS FOR MULTI-CHANNEL CONTROL," which are incorporated herein by reference in their entireties.

FIELD OF THE DISCLOSURE

The present disclosure relates generally to a user input device to control more than one attribute of a load and, more particularly, to a user input device, an application to generate a program for the user input device, and an application to perform the program for the user input device to generate more than one control outputs based on a user input via the user input device.

BACKGROUND OF THE DISCLOSURE

Switches, often referred to as light switches, typically comprise an actuator to turn on and off power to a load such as a luminaire or light bulb. Some switches, often referred to as dimmer switches, add a separate user input device to a switch to change the intensity of a luminaire. Dimmer switches became popular with use of incandescent bulbs. Since incandescent bulbs are effectively a resistance in-line with the power source and the brightness or intensity of incandescent bulbs is a function of the power (voltage times current) expended by the bulb, the original dimmer switches could control the intensity of the incandescent bulbs.

With the advent of the fluorescent bulbs and light emitting diode (LED) bulbs that require minimum excitation voltages to emit light as well as concern about the power expenditure associated with the luminaires, many new dimmer switches have been designed to adjust the power expenditures by bulbs. Such controls generate control signals that cycle the power provided to a light bulb between a low power level and a high power level. The cycle is referred to as the duty cycle and the average power provided to the luminaires determines the intensity level of the light provided by the bulb.

Certain LED bulbs also offer the ability to change the color temperature of the light intensity. The color temperature of the light is also referred to as the light color, temperature, or correlated color temperature (CCT) and is typically measured using a Kelvin scale. The color temperature of the LED bulbs are referred to as CCTs because LED bulbs mix multiple colors of LEDs (such as red, green, and blue) to approximate colors of different wavelengths. The Kelvin scale generally describes color temperature between 2700K (degrees Kelvin) and 6500K. Light with a color temperature in the range of 2700K to 3000K is considered a warm to soft white light and is yellowish similar to the light produced by incandescent bulbs. Light with a color temperature in the range of 3500K to 4100K is considered a cool to bright white light and light with a color temperature in the range of 5000K to 6500K is considered a natural to daylight and is bluish.

SUMMARY OF THE INVENTION

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Some embodiments include a device. The device may comprise a memory to store a program; an actuator to connect power to or disconnect power from a load; a user input device to adjust a first attribute of the load; a wireless communication interface to receive the program; and a controller to generate a first control signal to set the first attribute of the load and a second control signal to set a second attribute of the load based on adjustment of the first attribute and the program.

Further embodiments include a non-transitory computer-readable medium comprising computer-readable code, the computer-readable code, when executed by a processor, to perform operations. The operations may comprise determining a first event from a set of events, the first event associated with a first trigger and a first action, the first action to transition an intensity of a luminaire and determining to perform the action associated with the first event in response to occurrence of the first trigger, wherein the first trigger comprises activation of a user input device of a switch coupled with the luminaire. The operations may further comprise generating a first control signal based on the activation, the first control signal to set the intensity and generating a second control signal based on a relationship between the first control signal and the second control signal, the second control signal to set the color temperature.

Other embodiments include a non-transitory computer-readable medium comprising computer-readable code, the computer-readable code, when executed by a processor, to perform operations. The operations may comprise identifying the switch via a user interface, a switch comprising more than one control outputs per physical input to generate a control signal for each of the more than one control outputs based on activation of the physical input; and determining a program including more than one scene, wherein each scene comprises an event, an intensity, and a color temperature. The intensity may comprise a value to indicate a pulse width of a first control signal of the more than one control signals and the color temperature may comprise a value to indicate a pulse width of a second control signal of the more than one control signals. Determining the program may comprise determining a relationship between the first control signal and the second control signal responsive to activation of the physical input, the relationship to identify an incremental change in the second control signal based on an incremental change in the first control signal. Furthermore, the operations may comprise communicating the program to the switch to program.

BRIEF DESCRIPTION OF THE DRAWINGS

By way of example, specific embodiments of the disclosed device will now be described, with reference to the accompanying drawings, in which:

FIGS. 1E and 1F illustrate embodiments of data structures for schedules in the processing device and a schedule in the switch in FIG. 1A;

FIG. 1G illustrates an embodiment of a first control signal and a second control signal generated by the switch in FIG. 1A;

DETAILED DESCRIPTION

Figure 1A:
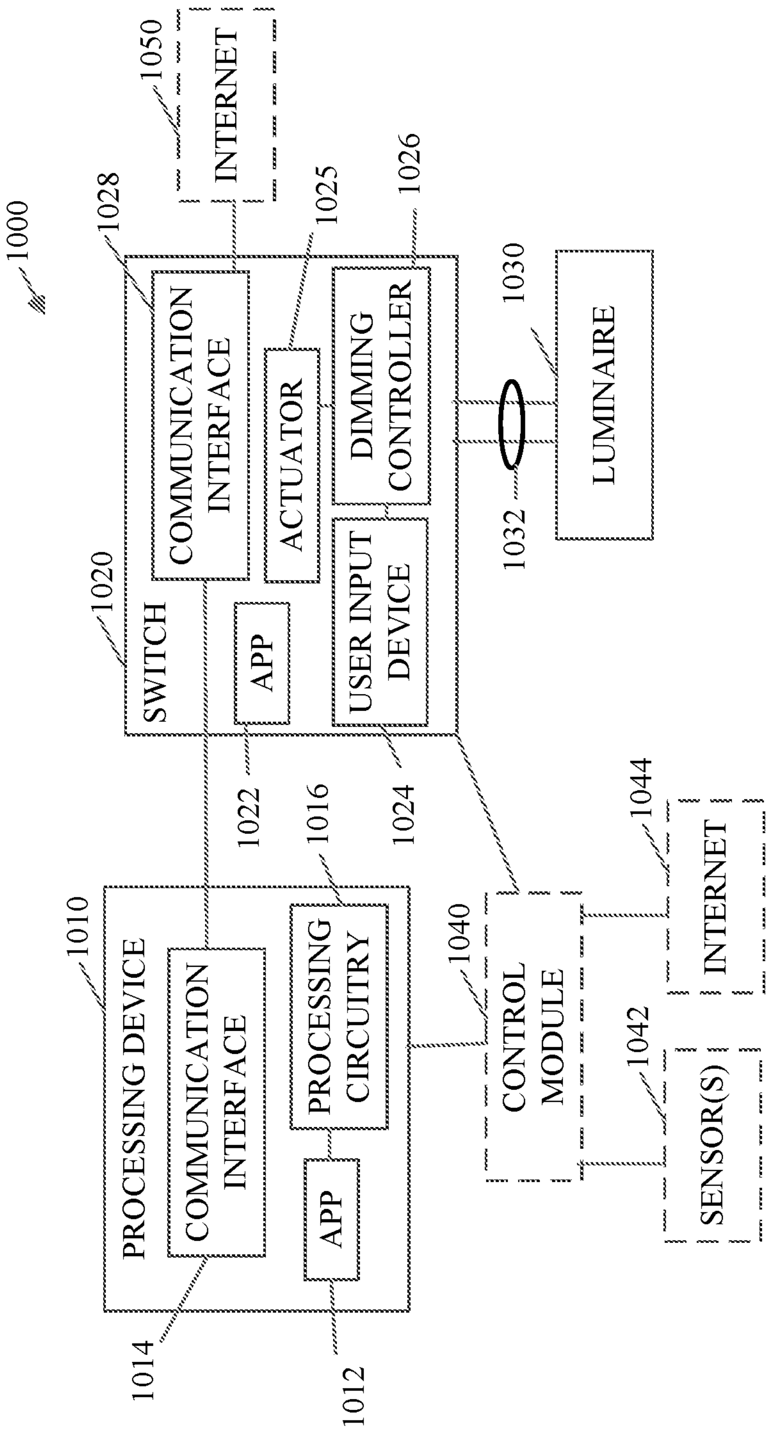
FIG. 1A illustrates an embodiment of a system including a processing device, a switch coupled with a luminaire and an optional control module.

Devices, systems, and methods in accordance with the present disclosure will now be described more fully hereinafter with reference to the accompanying drawings, in which preferred embodiments of the devices, systems, and methods are shown. The disclosed devices, systems, and method, however, may be embodied in many different forms and should not be construed as being limited to the embodiments set forth herein. Rather, these embodiments are provided so that this disclosure will be thorough and complete, and will fully convey the scope of the devices, systems, and methods to those skilled in the art. In the drawings, like numbers refer to like elements throughout.

The present disclosure is directed toward a user input device in an electrical device, an application to generate a program for the user input device, and an application to perform the program for the user input device to generate more than one control outputs based on a user input via the user input device. The user input device may reside in an electrical device such as a switch comprising an actuator to connect power to and disconnect power from loads such as lighting and motor loads. The user input device may comprise a physical input device for a user to adjust one or two attributes of a load connected to the switch. For example, the user input device may reside in a light switch and may provide a single user input to adjust the intensity level and color temperature of one or more luminaires coupled with the light switch.

Many embodiments are generally directed towards applications that require more than one control signal to adjust or set more than one attribute of a load. For instance, a luminaire may include LED bulbs that have at least two adjustable attributes such as intensity level and color temperature. Note that LED bulbs, as discussed herein, refer to any device that uses LEDs for light sources and that have more than one adjustable attribute. Note also that while the discussions herein often describe a light switch for LED bulbs, a user input device in any electrical device for any load that has at least two adjustable attributes falls within the scope of the embodiments described herein.

Several embodiments provide a switch with an actuator to connect power to or disconnect power from a load and a user input device to adjust two or more attributes of the load. The switch is an electrical device that has a first function configured to connect or disconnect power from a load via the actuator and may include the user input device to perform a second function such as dimming luminaires or controlling motor loads. Note that dimming the load to off, such as a zero percent duty cycle, effectively switches the load off.

To perform the first function, the switch may comprise an actuator to complete or close a circuit between two line voltage wires or between a line voltage wire and a neutral wire through a load to connect power to the load. The actuator may open the circuit to disconnect power from the load. In some embodiments, the actuator may comprise physical contacts to physically connect or physically disconnect to apply power to or remove power from the load. In other embodiments, the actuator may be an electronic switch that can apply power to or disconnect power from a load without physically moving contacts such as use of a power transistor. In still other embodiments, the switch may comprise an actuator such as a transistor that can apply power to a load via a power transistor or relay/contactor located at the load. In some embodiments, the switch may disconnect power from the load while maintaining power to other circuitry in the switch.

The user input device, as discussed herein, may comprise one or more user inputs such as buttons, rocker switches, or other switches that can provide a user input to adjust an attribute of the load. In such embodiments, the switch may generate two or more control signals based on the user input. For instance, in some embodiments, the switch may generate a first control signal related to or proportional to the user input from the user input device and may generate a second control signal. The second control signal may be based on first control signal or the user input from the user input device. In further embodiments, the switch may generate more than one control signal based on relationships between the more than one control signal or between the more than one control signal and the user input.

In several embodiments, the switch may receive user input in the form of a program. The program may comprise scenes generated in a remote application and wirelessly communicated to the switch. The remote application may execute on, e.g., a mobile phone and may wirelessly communicate with the switch via wireless communication protocols. Some embodiments implement wireless communication protocols such as Personal Area Networks such as Bluetooth or Bluetooth Low Energy in accordance with, e.g., the Bluetooth Core Specification v5.0 published Dec. 6, 2016, Bluetooth Mesh, Near Field Communication, mesh networks such as Zigbee or Z-wave, one or more cellular communication standards such as one or more 3rd Generation Partnership Project (3GPP), 3GPP Long Term Evolution (LTE), 3GPP LTE-Advanced (LTE-A), 4G LTE, and/or 5G New Radio (NR), technologies and/or standards, one or more infrared communication protocols, etc. Further embodiments implement one or more Institute of Electrical and Electronics Engineers (IEEE) 802.11 standards (sometimes collectively referred to as "Wi-Fi"). Such standards may include, for instance, the IEEE 802.11-2016, published Mar. 29, 2012, and the IEEE 802.11ax/D1.4, published August 2017. Some embodiments implement the IEEE standards in accordance with a Wi-Fi Alliance specification such as the Wi-Fi Peer-to-Peer (P2P) technical specification version 1.7 published in 2017. Some embodiments implement a combination of one or more protocols of one or more of the standards and/or specifications. The embodiments are not limited to these standards.

The scenes may comprise settings for control signals and may be triggered by events. A program may comprise a schedule of events such as a day of the week, a time of the day, an input from one or more sensors, and/or the like. For example, one event in a schedule may generate a first scene with one or more luminaires in a hallway and/or living room by setting the one or more luminaires be at a specific light intensity level and color temperature at sunrise on Mondays through Fridays. Another event in the schedule may set the second scene with the one or more luminaires at 7 am (or in response to detection of motion by a motion sensor) on Saturdays and Sundays. Another event in the schedule may set the third scene with one or more luminaires in an office by setting the one or more luminaires in the office to a specific light intensity level and color temperature at 8 am on Mondays through Fridays and to turn off the one or more luminaires in the office at 6 pm.

The remote application may interact with a user to generate one or more schedules of events for a single switch or for multiple switches to set scenes with one or more luminaires in, e.g., an office building, a store, a home, and/or the like. In some embodiments, the remote application may create one or more profiles and each profile may define relationships between control signals and/or between user input and control signals for a single switch or for multiple switches. For instance, each profile may define a schedule including a series of events and may also define adjustments to more than one control signals responsive to physical activation of a user input device in a switch or more than one user input devices in one or more switches.

In several embodiments, the user may name each profile and may manually switch between profiles or schedule one or more events to switch between profiles. In many embodiments, a user may name each profile such as "Home", "Away", "Vacation", and/or the like. In one embodiment, for instance, an event may monitor for a lack of or an absence of detection of motion or other sensor input for a period of time and may, in response, switch the profile for one or more switches to an "Away" profile or a "Vacation" profile. In some embodiments, each profile may define a complete schedule for one or more switches for a week based on days of the week, months of the year, seasons of the year, times of the day, input from one or more sensors, other events, and/or the like.

In many embodiments, the switch may comprise circuitry such as a microcontroller to generate the control signals based on a program and user input via the user input device. The program may establish one or more relationships between the user input and the control signals. The program may comprise a default program, a user-selected program, a custom program, or a combination thereof. The program may comprise, for instance, one or more settings such as default preferences, user preferences and, in some embodiments, code. For example, the switch may provide power and communication signals to a ballast of a luminaire for a light bulb. In some embodiments, the switch may turn on or power the luminaire, e.g., by activating a coil in a relay of the ballast or by activating a channel of a power transistor in the ballast of the luminaire. The switch may turn off the luminaire, e.g., by deactivating a coil in a relay of the ballast or by deactivating a channel of a power transistor of the ballast of the luminaire. While the coil or channel is activated, the switch may transmit a first control signal to identify or set an intensity level for the luminaire and may transmit a second control signal to identify or set a color temperature of the luminaire.

When the switch initially provides power to the luminaire, the switch may transmit first and second control signals based on a previous setting for the control signals, based on the program, or based on a combination thereof. For instance, the first and second control signals may indicate an intensity level and a color temperature that was the setting just prior to powering off the luminaire in accordance with, e.g., a default setting in the program. The switch may alternatively generate the first and second control signals based on triggers such as, e.g., a current time of day and/or input from one or more sensors in accordance with, e.g., a user preference, setting, or event in the program. In some embodiments, the program may comprise one or more profiles and each profile may comprise alternative settings or preferences. The one or more profiles may comprise a default profile, user-selected profile, a custom profile, and/or combinations thereof.

After the switch is turned on, a processor of the switch may generate and transmit the first and second control signals to indicate a current intensity level and a current color temperature for a luminaire. In some embodiments, the switch may modify or generate a different set of control signals based on activation of the user input device, input from one or more sensors, occurrence of one or more events identified in a schedule of a program, or a combination thereof. For example, a user may program the switch to set a scene upon activation of the luminaire based on a schedule of events that include intensity levels and color temperatures based on a time of day. The switch may include a processor such as a microcontroller to determine the most recent event that would have occurred based on the current time and determine an intensity level and a color temperature associated with the most recent event. The processor may generate the first control signal to indicate the intensity level as well as generate the second control signal to indicate the color temperature. Furthermore, if a user decides to override the current settings, the user may activate the user input device of the switch and the processor may modify the first and second control signals based on a relationship in the program that relates changes in the intensity level and changes in the color temperature with activation of the user input device.

In some embodiments, the program may include a relationship to relate one or more pairs of color temperature and intensity level and/or a range of color temperatures with a range of intensity levels. The relationship may be linear or non-linear. For instance, the relationship may identify a color temperature for each range of more than one range of intensity levels. In other embodiments, other programs, other profiles with a program, other schedules of a program, or other ranges of intensity levels, the relationship may identify a mathematical relationship between the intensity level and the color temperature such as $y=a*x+b$, $y=a*ex+b$, $y=b+a*\log x$, or the like where y is the color temperature in degrees Kelvin, x is the intensity level in lumens, e is an exponent, log is a logarithm, and a and b are constants. In some embodiments, a and/or b are positive and/or negative integers. In some embodiments, a and/or b are positive and/or negative fractions. In further embodiments, a and/or b can be any combination of integers and/or fractions.

To illustrate, a user may activate the user input device to increase the present intensity level of the luminaire. The user input device that is a rocker switch and the rocker switch may have a first depressed position that causes the intensity level of the luminaire to increase or decrease. In many embodiments, the rocker switch has a first position at which the intensity level decreases, a second "neutral" position that does not change the intensity level, and a third depressed position that increases the intensity level of the luminaire. The user may, e.g., hold a user input device that is a rocker switch in one of the depressed positions for a duration and the duration may be proportional to an amount of change in the intensity level of the luminaire and/or the color temperature of the luminaire. A relationship of the program may relate incremental changes in the color temperature to incremental changes in the intensity level and/or vice versa.

The switch may comprise a processor or other processing circuitry to generate and output a first control signal and a second control signal responsive to the user's action. The processor may generate and output the first control signal to the luminaire to vary the light intensity level based on the duration that the user holds the rocker switch in the first depressed position. The processor may also generate and output the second control signal based on the duration that the user holds the rocker switch in the third depressed position to vary the color temperature in conjunction with variation of the intensity level in accordance with the relationship described by the program.

In further embodiments, the program may cause the switch to adjust the intensity level and color temperature settings for the luminaire based on the events related to the passage of time and/or input from sensors. For instance, the program may specify events as specific times of the day, specific input(s) from one or more sensors, or a combination thereof. For events based on the passage of time, the switch may determine the next event in terms of a count for a counter to count down to zero to indicate the time of the event. Once the counter reaches zero (or the equivalent), the zero counter may trigger an action associated with the event such as the adjustment of the control signals for the intensity level and color temperature for a luminaire that approximates or correlates with a change in the intensity of daylight at the geographical location of the switch. The adjustment may also be based on input from one or more sensors. Such a program may, advantageously, reduce the amount that the user's eyes need to adjust when entering an interior area of a house or building.

In many embodiments, the user input device can indicate an increase or a decrease in the value of an attribute of a load. For example, a dimmer switch (referred to herein as an intensity adjustment device) for a light source may include a slide switch or a rocker switch, or one or more capacitive switches, or one or more other switches or sensors. The slide switch may indicate a decrease in or reduction of the value for the attribute, such as the intensity level of a light source, when the user slides the switch in a first direction and may indicate an increase in or enlargement of the value of the attribute when the user slides the switch in a second direction. The rocker switch may rock in more than one direction and rocking the rocker switch in a first direction may indicate a decrease in or reduction of the value for the attribute. Rocking the switch in a second direction may indicate an increase in or enlargement of the value of the attribute when the user slides the switch in a second direction.

In some embodiments, one or more relationships between control signals and the user input may be fixed. For instance, a relationship between the first control signal and the user input through the user input device may be fixed. In one such embodiment, the user may press the user input device and the switch may interpret the user input as a single decrease, e.g., in an intensity level of an attached luminaire. As a result, the switch may reduce, e.g., a pulse width, or duty cycle, of the first control signal by, e.g., 10%, to reduce the light intensity emanating from a bulb of the luminaire by 10%. The 10% reduction may be fixed and may range between 100% and 0% or may be a user selected range such as between 100% and 10%. In another such embodiment, the 10% reduction may be fixed as, e.g., one-tenth of the default range of intensity for the luminaire or one-tenth of the user selected range of intensity of the luminaire.

In some embodiments, a relationship between a second control signal and the user input through the user input device may be fixed or the relationship between the first control signal and the second control signal may be fixed. For instance, activation of the user input device may change the duty cycle of the first control signal by 10% and may also cause, via a program, a processor to change the duty cycle of the second control signal by, e.g., 10%. In other embodiments, a change in the duty cycle of the first control signal by 10% may cause the processor to change the duty cycle of the second control signal by, e.g., 10%.

FIG. 1A illustrates an embodiment of a system 1000 including a processing device 1010, a switch 1020 coupled with a luminaire 1030 and an optional control module 1040. The processing device 1010 may be any type of computing device now known or hereafter developed including, for example, a desktop, a smartphone, a tablet, a notebook, a laptop, a netbook, or other computing device capable of communicating wirelessly with one or more wireless communication networks. The processing device 1010 may be capable of executing an application 1012. The application 1012 may represent code in memory, hard-coded logic, and/or a combination thereof.

The processing device 1010 may also comprise a communication interface 1014 to communicate a program to the switch 1020. In many embodiments, the communications interface 1014 comprises a wireless communications interface capable of wirelessly communicating with the communications interface 1028 of the switch 1020 via one or more wireless communication protocols such as Bluetooth or Wi-Fi. In some embodiments, the communications interface 1014 comprises or interconnects with an array of antenna elements, or antennas.

In further embodiments, one or more of the processing circuitry 1016, the memory storing the application 1012, and the communication interface 1014 may reside in a system-on-a-chip (SoC) or in a chip package with multiple integrated circuits. In other embodiments, one or more of the processing circuitry 1016, the memory storing the application 1012, and the communication interface 1014 may reside in distinct chips and be interconnected via one or more circuit boards and/or conductors.

In other embodiments, the communications interface 1014 may communicate with a control module 1040 and the control module 1040 may communicate with the communications interface 1028 of the switch 1020 via a wired or wireless communication protocol. The control module 1040 may be, e.g., a hub, a gateway, a site controller, a combination thereof, or the like. For example, the processing device 1010 may generate a program to set the attributes of the load connected to the switch 1020 such as the intensity level and color temperature of the luminaire 1030.

The application 1012 may control, via the communication interface 1014, the communication interface 1028, and the dimming controller 1026, the control signals transmitted from the dimming controller 1026 to the luminaire 1030 to set attributes of the load, e.g., the intensity level and the color temperature of the luminaire 1030. In many embodiments, the application 1012 may generate a program in the form of a series of events and/or a relationship to control the luminaire 1030 via the switch 1020.

The switch 1020 may also comprise an actuator 1025 to receive physical input from a user to connect or disconnect power from the luminaire 1030. In some embodiments, the actuator 1025 may disconnect power from the dimming controller 1026. In other embodiments, the actuator 1025 may provide an input to the dimming controller 1026 that reduces the duty cycle of the output signals 1032 to zero percent or otherwise reduces the power to the luminaire 1030 to effectively turn off the luminaire 1030.

The relationship may establish the effect of user input via the user input device 1024. For example, the application 1012 may allow a user to select the switch 1020 and set the intensity level and color temperature of the luminaire 1030 coupled with the switch 1020. The application 1012 may also (or alternatively) set a relationship between the user input via the user input device 1024 and the control signals 1032 transmitted to the luminaire 1030. The relationship may facilitate generation of more than one control signals 1032 by the dimming controller 1026 for the luminaire 1030 in response to a single user input from via the user input device 1024. The dimming controller 1026 may comprise a processor or other circuitry such as a triode to provide control signals for the ballast or luminaire 1030.

To illustrate, the user input device 1024 may comprise a rocker switch. The user may press the upper portion of the rocker switch to instruct to the dimming controller 1026 to adjust a first attribute of the load by increasing the intensity level of the light generated by the luminaire 1030 and may press the lower portion of the rocker switch to instruct the dimming controller 1026 to adjust a second attribute of the load by decreasing the intensity level of the light generated by the luminaire 1030. The relationship provided from the application 1012 in the processing device 1010 may establish a linear or non-linear mathematical association between the intensity setting for the luminaire 1030 and the color temperature for the luminaire 1030. As a result, the dimming controller 1026 may incrementally change the color temperature for the luminaire 1030 for one or more incremental changes to the intensity level of the luminaire 1030 generated in response to the user input.

In some embodiments, the program may comprise one or more schedules of events to set or adjust attributes of the load. Each event may include programming to set an intensity level and a color temperature for lighting fixtures such as the luminaire 1030. Events may comprise, for example, a detection by a sensor, detections by a combination of sensors, an activation of the switch 1020, activation of the user input device 1024, a time of day, a sunrise, a sunset, and/or a combination thereof. For example, the application 1012 may provide an interface for a user to select one or more switches such as the switch 1020 to associate with an event. The event may be, e.g., a time of day and the user may select, via the application 1012, an intensity level and a color temperature for luminaires coupled with the switches selected for the event. In some embodiments, the application 1012 may transfer the event programming to each of the switches selected for the event after completion of the entry of the event by the user. In other embodiments, the application 1012 may transfer the event to the control module 1040 and the control module 1040 may transmit the event to the corresponding switches or may, at the time or occurrence of the event, transmit the settings for the attributes such as the intensity level and the color temperature to the corresponding switches.

If included in the system 1000, the control module 1040 may maintain and process a program with one or more schedules for one or more switches such as the switch 1020 and, in some embodiments, one or more profiles. The schedules may comprise a series of events or scenes for different switches; different combinations of switches; different areas of a home, restaurant, or office; and/or the like. For example, a user of a restaurant may set a first schedule for the reception area of the restaurant, a second schedule for private dining areas, and a third schedule for a main dining area.

Profiles may identify different modes of operation for the different seasons of the year, different persons, different states of activity, and/or the like. The modes of operation for a home may include, e.g., "Home", "Away", and "Vacation" and a user may select the profile or may schedule an event to change the profile. For instance, a user may set an event as a time of day for an action to change the profile to "Away" when the members of the household are typically at work or school and an event as a time of day to change the profile to "Home" when one or members of the household typically return home from work or school. As another example, the user may set the event of a window of time for the action of returning the mode from "Away" to "Home" and the trigger for changing the mode may be predicated on receipt of output from a motion sensor during the window of time.

Note that, in some embodiments, the time selected for the event or the sensor selected for the event may trigger the action of the event. Such embodiments may use the time of day or the receipt of the sensor output as an immediate trigger for the action of the event rather than creating event programming to trigger the action based on the time or sensor selected for the event and/or other criteria. For example, if the event is set to sunrise, a determination that the current time is the time of sunrise may trigger the action associated with the event. Similarly, if the event is motion detection by a sensor, the trigger may be the receipt of the signal indicating a motion detection by the sensor.

The control module 1040 may couple with one or more sensors 1042 and may couple with the Internet 1044. In many embodiments, the control module 1040 can support events based on the time of day, the sunrise, and the sunset, one or more detections or lack of detections by one or more of the sensor(s) 1042, and the like. In several embodiments, the control module 1040 may include clock circuitry to maintain a time of day as well as astronomical clock circuitry to adjust for local sunrise and sunset times. For embodiments with access to the Internet, the control module 1040 may periodically update or verify the accuracy of the clock circuitry and/or the astronomical clock circuitry.

The switch 1020 may be an electrical device to generate two or more control signals 1032 based on a single user input via the user input device 1024 to control two or more attributes of a load such as the luminaire 1030. The switch 1020 may comprise an application 1022 for execution on processing circuitry of the switch, a user input device 1024, a dimming controller 1026, and a communications interface 1028. The switch 1020 may interact with the processing device 1010 directly via the communication interface 1028 or indirectly via the communication interface 1028 and the control module 1040 depending on the configuration of the system 1000.

In the present embodiment, the processing circuitry of the switch may reside in the dimming controller 1026. The application 1022 may execute on the processing circuitry to perform a program in the form of a relationship between user input via the user input device 1024 and the control signals 1032. For example, the dimming controller 1026 may generate a first control signal to set or indicate an intensity level for the luminaire 1030 and a second control signal to set or indicate a color temperature for the luminaire 1030.

The control signals 1030 may be any type of signals that can communicate values for the intensity level and the color temperature to the luminaire 1030 or a ballast for the luminaire 1030. In some embodiments, the control signals 1032 comprise pulse width modulation (PWM) control signals. For PWM control signals, the value of the intensity level for the luminaire 1030 may be related to or proportional to the duty cycle of the control signal or the average power associated with the first control signal and the color temperature for the luminaire 1030 may be related to or proportional to the duty cycle of the control signal or the average power associated with the second control signal. In many embodiments, the first control signal may cycle the luminaire on and off in accordance with the duty cycle to establish the intensity level of light emitted from the luminaire 1030 via, e.g., a relay and/or power transistor in the switch 1020 or in the luminaire 1030 or a ballast for the luminaire 1030.

The second control signal may set or establish a color temperature based on the duty cycle of the second control signal. The luminaire 1030 may convert the second control signal to generate signals for more than one color LED or interpret the second control to generate signals for more than one color LEDs to generate or approximate a color temperature indicated by the second control signal.

The application 1022 may also perform a schedule comprising a series of events. The series of events may comprise one or more events based on a time of day, one or more events based on input from one or more sensors, and/or the like. For instance, the application 1022 may monitor a time provided by clock circuitry of the switch 1020 to determine the occurrence of a time of day for an event and may trigger one or more actions(s) associated with the event based on the occurrence. In other embodiments, the application 1022 may establish a counter in counter circuitry of the switch 1020 to count down to the next time of day event and may trigger the action(s) associated with the event in response to expiration of the counter.

The communication interface 1028 may facilitate communication with the communication interface 1014 of the processing device 1010 or a communication interface of the control module 1040 via any known wireless communication standard or protocol. Example wireless protocols may include, for example, Wi-Fi (e.g., any IEEE 802.11 a/b/g/n network); a Personal Area Network (PAN) such as Bluetooth, Bluetooth Low Energy, or Bluetooth Mesh; Near Field Communication; a mesh network such as Zigbee or Z-wave; any cellular communication standard; any infrared communication protocol; etc. The communication interface 1028 may include one or more transceivers to accommodate wireless communication with devices and, possibly cloud service platforms, over a variety of wireless communication standards or protocols. In some embodiments, the communication interface 1028 may comprise an antenna such as an array of antenna elements and, in other embodiments, the communication interface 1028 may couple with an antenna such as an array of antenna elements.

The processing device 1010, the switch 1020, and the control module 1040 may communicate wirelessly over any frequency within any licensed or unlicensed frequency band (e.g., over a 2.4 GHz operating frequency band or a 5 GHz operating frequency band). The system 1000 may implement any known security or encryption protocol or standard such as, for example, WPA or WPA2, to communicate, either directly or indirectly, with other devices over a wireless connection and/or through one or more intermediate devices (such as, for example, a cellular base station, a Wi-Fi router, a cloud service platform, etc.).

Figure 1B:
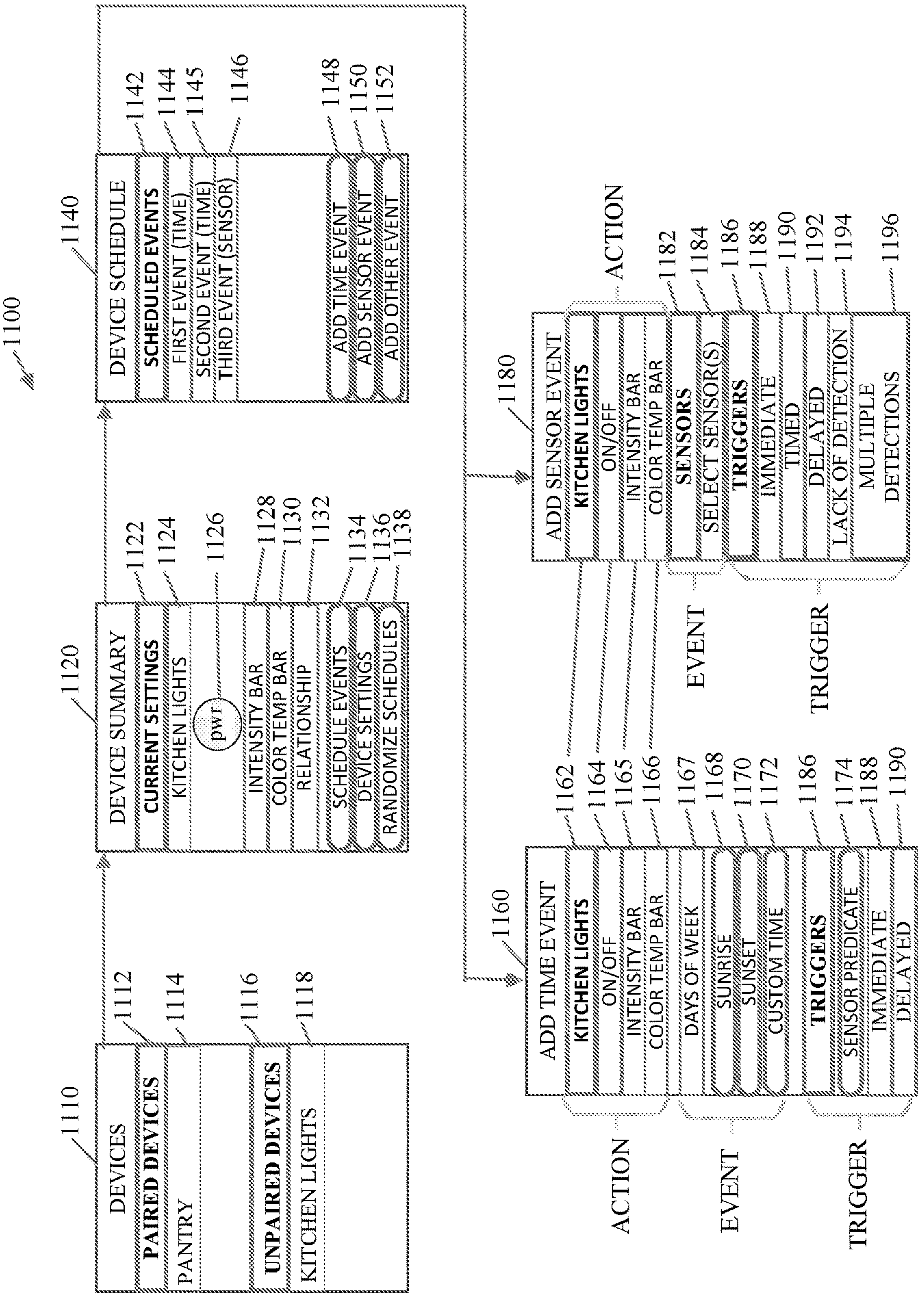
FIG. 1B illustrates an embodiment of a series of screen shots of an application executing on a processing device such as the application to execute on the processing device in FIG. 1A.

FIG. 1B illustrates an embodiment of a series of screen shots (devices 1110, device summary 1120, device schedule 1140, add time event 1160, and add sensor event 1180) of an application executing on a processing device such as the application 1012 executing on the processing device 1010 in FIG. 1A. The screen shot 1110 may represent a first user interface in the application, may display compatible wireless devices within range of the processing device, and may include a list of paired devices 1112 and a list of unpaired devices 1116. The list of paired devices 1112 may include a name or identifier for each compatible device, such as the "pantry" device, within the wireless communication range of the processing device. In the present embodiment, a paired device is an electrical device with a Bluetooth wireless communication interface that the user has paired with the application on the processing device. Pairing refers to a basic process to establish communications including an authentication procedure that provides a level of security.

Other embodiments may implement other security protocols. For instance, devices in Bluetooth mesh networks may perform provisioning via a bearer such as an advertising bearer or a Generic Attribute Profile (GATT) bearer rather than pairing to add a device as a node in the mesh network. The process of provisioning also provides a level of security. In the present example, such devices may be referred to as nodes and unprovisioned devices rather than paired and unpaired devices, respectively.

The list of unpaired devices 1116 may list compatible devices or unprovisioned devices that are within wireless communication range of the processing device and have not been provisioned, or "paired" with the processing device. For instance, the "Kitchen Lights" device 1118 may be an electrical device installed in the kitchen that is ready to pair with the processing device.

If the user selects the unpaired "Kitchen Lights" device 1118, the application executing on the processing device may advance to the device summary 1120. The application may communicate with the "Kitchen Lights" device 1118 via a wireless communication interface of the processing device such as the wireless communication interface 1014 in FIG. 1A to obtain information about the status of the "Kitchen Lights" device 1118.

After obtaining the status of the "Kitchen Lights" device 1118, the application may display the device summary 1120 with an indication of the name of the device "Kitchen Lights" 1128, and an indication regarding whether the "Kitchen Lights" device 1118 are powered on or are powered off 1126. The application may display an indication of the intensity level of lights coupled with the "Kitchen Lights" device 1118 via, e.g., an intensity bar 1128; an indication of the color temperature of lights coupled with the "Kitchen Lights" device 1118 via, e.g., a color temperature bar 1130; and an indication of a relationship 1132 such as a default relationship for changing the intensity level and the color temperature of the "Kitchen Lights" device 1118 via a user input device such as the user input device 1024 in FIG. 1A. The default relationship may comprise a linear or non-linear relationship for adjusting the intensity level and color temperature of the lights coupled with the "Kitchen Lights" device 1118.

In many embodiments, the user may press the powered on or powered off indication 1126 to change the status of the lights, i.e., turn on or off the lights. Furthermore, the user may adjust the intensity level of the lights coupled with the "Kitchen Lights" device 1118 by selecting an intensity level on the intensity bar 1128 and may also change the color temperature by selecting a color temperature on the color temperature bar 1130.

In some embodiments, the user may adjust the relationship 1132 between the intensity level and color temperature for use with the user input device by selecting the relationship 1132. Some embodiments may include more than one selection to choose a type of relationship such as a linear relationship, an exponential linear relationship, a logarithmic relationship, a non-linear relationship, or the like. In some embodiments, parameters of the relationship can be selected or set by the user. For instance, the user may be able to change or enter new values for the constants a and b for one or more of the different types of relationships in accordance with the user's preference.

To illustrate, a linear relationship may be represented by the equation $y=ax+b$. The application may allow the user to select the values of a and b or enter values for a and b. Similar parameters may be selectable or editable for each type of relationship.

In further embodiments, the application may allow the user to define the relationship 1132 by identifying a single color temperature for a range of intensities or a range of color temperatures for a range of intensities. For instance, a user may select four different color temperatures and assign a range of intensities to each color temperature. As a result, the application may generate a program for the "Kitchen Lights" device 1118 to set the corresponding color temperature when the lights are set to any intensity level within the range of intensities.

As another example, the application may allow the user to define the relationship 1132 by identifying a color temperature range for each range of intensities. For instance, a user may select four different color temperature ranges and assign a range of intensities to each color temperature range. As a result, the application may generate a program for the "Kitchen Lights" device 1118 to define a linear relationship between each range of color temperatures and each corresponding range of intensity levels and set the corresponding color temperature based on the corresponding linear relationship. As a specific example, the user may select a range of zero to 800 lumens as the range of intensities and the user may relate this range of intensity levels with a range of color temperatures between 2700K and 3500K. Based on the range of the intensity levels divided by the range of color temperatures, the application may determine a relationship as a 1 degree Kelvin change in color temperature per 1 lumen change in intensity and the application may generate a program that includes a relationship of 1K per lumen for intensity levels in the range of 0 lumens to 800 lumens.

The application may allow the user to schedule events 1134, set device settings 1136, and randomize schedules 1138. The application may allow the user to set various device settings 1136 in response to selection of the device settings 1136 on the user interface. The device settings may include an ability to turn on or off status information in the application such as the brightness level or intensity level of the light, whether the light is powered on or off, the color temperature of the light, fade rates for turning the light on or off, minimum and maximum intensity levels and/or color temperatures, and/or the like. In some embodiments, the device settings may also include turning on the light to a preset intensity level and/or a preset color; advanced diagnostics; and date, time, and location settings to facilitate, e.g., determination of the local sunrise and sunset times. In a further embodiment, the device settings may include an ability to reset authentication.

The randomize schedules 1138 device setting may be turned on to generate a random or pseudo-random schedule of events for turning on and off lighting connected to the paired "Kitchen Lights" device 1118, changing the color temperature for the lighting, and/or changing the intensity level of the lighting. In some embodiments, the randomize schedules 1138 device setting may create new events based on events in a schedule of events and randomize one or more attributes of the events such as the time of day of an event, the intensity level associated with the event, the color temperature associated with the event, and/or the like. Further embodiments may generate random sets of events or random sets of events that meet certain criteria such as events within certain windows of time, within certain intensity levels, within certain color temperature ranges, and/or the like.

The device schedule 1140 illustrates an example of a user interface generated by the application to create and order events for the "Kitchen Lighting" device 1118. The device schedule 1140 includes a list of scheduled events 1142 as well as interfaces to add a time event 1148, add a sensor event 1150, and add another event 1152.

In the present embodiment, the scheduled events 1142 includes a first event 1144, a second event 1145, and a third event 1146. The first and second events 1144 and 1145, respectively, are events based on a time of day and the third event 1146 is based on detection by a sensor 1146. The application may allow the user to select an event from the event list to edit or to add a new event. In many embodiments, editing an event based on the time of day arrives at the same user interface as used for adding an event based on a time of day except that the user interface will include the settings saved for the event being edited rather than default settings.

Adding the other event 1152 may include adding an event based on a criterion that is not a sensor event and not a time of day. For instance, the application may allow receipt of notifications via, e.g., the Internet of other communications medium to trigger changes to the lights connected to the "Kitchen Lights" device 1118 such as notifications from one or more web sites, text messages, emails, tweets, changes in stock market data, changes in commodity prices, etc.

Selection by the user to add a time event 1148 may open the user interface to add time event 1160. Adding a time event 1148 may define event programming for an event that defines the time of the event, an action associated with the event, and a trigger associated with the event. The action associated with the add time event 1160 is setting the state of the "Kitchen Lights" device 1118. Further embodiments may include other actions to associate with events such as actions to change modes based on, e.g., seasons, persons, whether the home is occupied or not, and/or the like.

The add time event 1160 interface may include a list of settings to define the status of the light or luminaire connected to the "Kitchen Lights" device 1118 to define event programming for the action associated with the event. The time or times selected for the event such as the "sunrise" 1168, the "sunset" 1170, and the "custom time" 1172 may establish times to initiate event programming for the event on one or more "days of the week" 1167.

The first setting "on/off" 164 includes an interface to switch or toggle the "Kitchen Lights" 1162 between on and off. In other words, the present embodiment may perform the action of changing the status of the lights to the status indicated in the event programming at the time of the event or when the action is otherwise triggered by the event programming. In other embodiments, changes to can be relative. For example, the add time event 1160 interface, in such embodiments, may include event programming to change the powered status of the lights so the lights are powered on at the time of the event if the lights were powered off prior to the event, and vice versa.

The application may allow the user to include event programming to set the intensity level of the lights based on an indication on the intensity bar 1165, set the color temperature based on an indication on the color temperature bar 1166, and select the "days of the week" 1167 during which the event programming will initiate. Furthermore, the application may allow the user to select a time as sunrise 1168, sunset 1170, or a custom time 1172. Selection of the time may add, e.g., event programming to establish a count value in a counter circuit to decrement to zero to trigger the action associated with the event or establish a monitor to trigger the action based on a time indicated by a clock circuit of a switch that executes the event programming.

In some embodiments, the application may facilitate selection of a sensor event as a trigger or sensor predicate 1174 for performance of the action associated with the event. For example, the user may select a custom time 1172 such as 6 pm to turn on the light in the kitchen and may select a sensor predicate 1174 of a motion sensor at a garage after 5 pm as the trigger for the action of turning the light on. In other words, the light in the kitchen will turn on at 6 pm if motion is detected at some time between 5 pm and 6 pm at the garage. In many embodiments, the sensor predicate 1174 may open the add sensor event 1180 user interface to add the sensor predicate 1174 or a similar user interface. In some embodiments, the user may select one or more sensors for the sensor event from a list of local and remote sensors with respect to the switch such as the switch 1020 in FIG. 1A. A local sensor may include, e.g., the user input device 1024 and a remote sensor may include a remote motion detector in or around the same room or building in which the switch 1020 is located or any remote location via a network. For example, the remote sensor may be located an at office space and the event may cause the lights in the kitchen or other room to change to a specific color if the motion sensor at the office detects motion.

As discussed in conjunction with the sensor predicate 1174, the user can define the trigger for performance of an action associated with the event. The triggers such as the sensor predicate 1174, immediate 1188, and delayed 1190 add event programming to the event to define when to trigger the action associated with the event. For instance, the action may include event programming to set the "Kitchen Lights" 1162 to on, at a custom time 1172 of 6 am during weekdays, if the event programming for the sensor predicate 1174 is satisfied, immediately (immediate 1188) at the time associated with the event, which is 6 am on each weekday. In such an embodiment, if the time event is enabled, the event programming may initiate at the times selected for the event unless the trigger, the sensor predicate 1174, establishes an earlier time to initiate the event programming. For example, if the trigger establishes a time frame that is earlier than the time frame associated with the event, at least the event programming associated with the trigger (sensor predicate 1174) may initiate prior to the time set for the event.

In other embodiments, the user may select a trigger of delayed 1190. The delayed 1190 event programming may establish a fixed time delay, a time delay that varies based on an identified variable such as a value of a market index or the present chance of rain, a time delay based on activation of a sensor after the selected time for the event, and/or the like.

Selection by the user to add a sensor event 1150 may open the user interface to add sensor event 1180. The add sensor event 1180 user interface may add event programming to define a sensor event and a trigger to initiate event programming for an action associated with the event. In such embodiments, the sensor event may initiate event programming for the trigger and the event programming for the trigger may initiate event programming for the action such as setting the state of the "Kitchen Lights". In other embodiments, an event programming to monitor for the sensor combined with the event programming for the trigger may initiate upon enablement of the sensor event and may trigger the event programming for the action associated with the event in response to satisfaction of the sensor event and the trigger.

The add sensor event 1180 user interface may include a sensor list, select sensor(s) 1184, and a triggers list 1186 to identify a trigger associated with the sensor(s) selected in the sensors list. After selecting the sensor(s), the user may select a type of trigger for the sensor(s). If the user selects a single sensor or a set of sensors from which detection by a single sensor will trigger the event, the user may select the type of trigger as an immediate 1188 trigger, a timed 1190 trigger, a delayed 1192 trigger, or a lack of detection 1194 trigger. The immediate 1188 trigger may contain event programming to immediately trigger the action of the event upon detection by a selected sensor. The timed 1190 trigger may contain event programming to monitor for detection by the selected sensor within a specified window of time. The delayed 1192 trigger may contain event programming to trigger the event after expiration of a time delay after detection by the selected sensor. Furthermore, the lack of detection 1194 may contain event programming to monitor a time period during which there is no detection by the selected sensor and the absence of the detection during that time period may trigger the event.

The triggers 1186 list may also include contain event programming to trigger the action of the event in response to multiple detections 1196. The multiple detections 1196 event programming may monitor for multiple detections by all or two or more sensors of the selected sensors to trigger the event. For instance, one embodiment may include event programming to implement a setting with which the user specifies one or more sensors that have to indicate a detection to trigger the action of the event. Other embodiments set a fixed number of sensors that have to detect before the sensors trigger the action of the event.

Figure 1C:
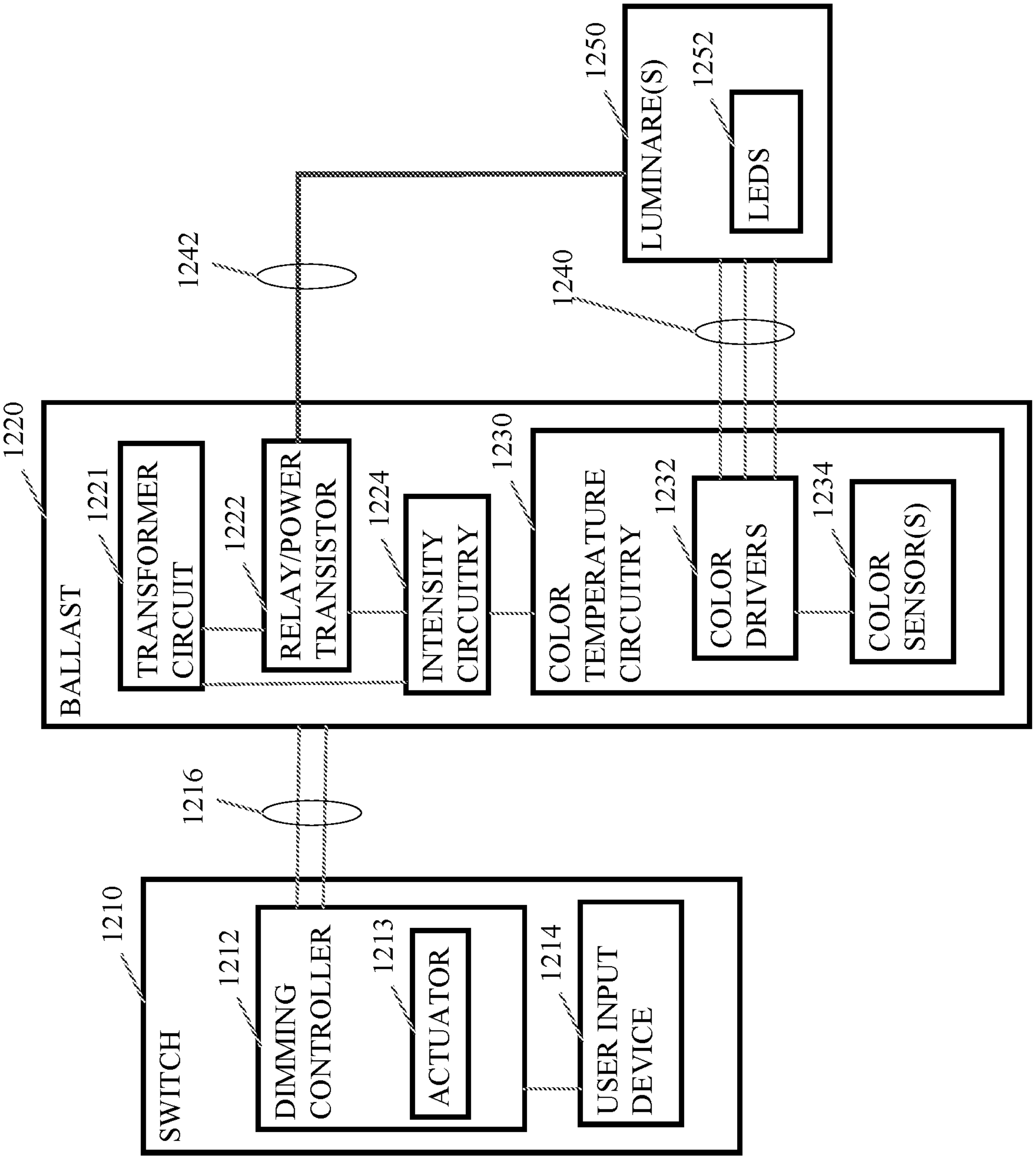
FIG. 1C illustrates an embodiment of a switch, ballast, and luminaires for the system in FIG. 1A.

FIG. 1C illustrates an embodiment of a switch 1210, a ballast 1220, and luminaires 1250 such as the switch 1020 and luminaire 1030 in the system 1000 in FIG. 1A. The switch 1210 may comprise an electrical device with a dimming controller 1212 to generate more than one control signal 1216 to control multiple attributes of a load based on a single user input via a user input device 1214. The dimming controller 1212 may comprise an actuator 1213 to turn on or off power to the ballast 1220. In some embodiments, the actuator 1213 may comprise a physical input for a user to manually turn the power on or off. In other embodiments, the actuator 1213 comprises a transistor, an integrated circuit, or other circuit element to connect or disconnect power from the load and may receive input from, e.g., a sensor or other user input locally at the switch 1210 or remote user input coupled with the switch 1210.

The user input device 1214 such as the user input device 1024 in FIG. 1A may comprise any type of user input such as a capacitive touch switch, a proximity sensor, a slide switch, a potentiometer, a rocker switch, a biometric switch, or the like. Activation of the user input device 1214 may comprise an input from a user to change the intensity level and/or color temperature of the luminaires 1250.

In response to the user input via the user input device 1214 and a program that includes a relationship for the control signals and the user input, the dimming controller 1212 may generate two control signals 1216. The first control signal may indicate an intensity level for the luminaires 1250 and the second control signal may indicate a color temperature for the luminaires 1250. In many embodiments, the control signals comprise pulse-width modulation (PWM) control signals. The pulse width modulation signals may have a pulse width of a voltage such as 10 volts for specified percentage of a cycle or period of a waveform to control the intensity level and color temperature of the luminaire(s) 1250. The percent of the cycle is typically referred to as the duty cycle and the duty cycle may range from a low percentage such as zero percent or 5% to a high percentage such as 95% or 100%. A PWM control signal with a 100% duty cycle may indicate a 100% lumen output or a maximum intensity level for the luminaire(s) 1250 and a PWM control signal with a 0% duty cycle may indicate a 0% lumen output or a minimum intensity level for the luminaire(s) 1250.

The dimming controller 1212 may generate the second control signal as a PWM control signal with a duty cycle corresponding to the first control signal or the user input based on the relationship provided by the program. For instance, the relationship may indicate that the duty cycle for the second control signal is two times the duty cycle for the first control signal or may indicate that the change in degrees Kelvin in the color temperature indicated by the second control signal is two times the change in the lumens indicated by the first control signal.

The ballast 1220 may comprise a transformer circuit 1221 such as an alternating current (AC) to direct current (DC) transformer and one or more relays or power transistors such as the relay/power transistor 1222 to sink current 1242 for the luminaire(s) 1250. The transformer circuit 1221 may couple with one or more line voltage wires or a line voltage wire and a neutral wire. Two line voltage wires provide out of phase voltages that are additive and provide a voltage of, e.g., 240 volts of alternating current (VAC) in some geographic locations. A line voltage wire and a neutral wire may provide a voltage of, e.g., 120 VAC in some geographic locations. The transformer circuit 1221 may transform the incoming voltage from the alternating current voltage to a direct current voltage at about 12 volts DC (VDC) to accommodate the intensity circuitry 1224, the color temperature circuitry 1230, and the LED(s) 1252. In other embodiments, the transformer circuit 1221 may transform the incoming voltage from the alternating current voltage to an alternating current voltage at about 12 volts AC (VAC) and an AC-to-DC converter (ADC) may convert the AC voltage to 12 VDC to accommodate the intensity circuitry 1224, the color temperature circuitry 1230, and the LED(s) 1252. Note that the voltages in VDC required by the circuitry may vary between embodiments so embodiments are not limited to operation at 12 VDC.

Note that in some embodiments of the luminaire(s) 1250, the content of the ballast 1220 is included within the circuitry of the luminaire(s) 1250. In such embodiments, the control signals output by the dimming controller 1212 may couple directly with the luminaire(s) 1250.

The intensity circuitry 1224 may interpret or convert the duty cycle of the first control signal to determine the intensity level of the luminaire(s) 1250. For example, the intensity circuitry 1224 may apply the first control signal to a coil of a relay or a gate of a power transistor of the relay/power transistor 1222 to transition the power drawn from the transformer circuit 1221 to the luminaire(s) 1250 at a frequency of the first control signal. In many embodiments, the frequency of the first control signal may be 120 Hertz (Hz) or greater to avoid a flicker of the light produced by the LED(s) that is visible to the human eye. The frequency is one divided by the period of the first control signal waveform. The period is the amount of time in seconds between the rising edge of the voltage pulses in the first control signal.

The color temperature circuitry 1230 may interpret or convert the duty cycle of the second control signal to determine the color temperature of the luminaire(s) 1250. The color temperature circuitry 1230 may comprise color drivers 1232 and color sensor(s) 1234. The color drivers 1232 may drive or apply power to different color LEDs 1252. For instance, the color drivers 1232 may comprise a driver for red LEDs, a driver for green LEDs, and a driver for blue LEDs to generate a correlated color temperature (CCT) that estimates or approximates the color temperature indicated by the second control signal.

In many embodiments, the color temperature circuitry 1230 may comprise the color sensor(s) 1234 to detect the color temperature of the light output by LEDs. In such embodiments, the color sensor(s) 1234 may provide feedback to the color drivers 1232 to adjust for changes in the output of the LEDs 1252 due to, e.g., aging.

The luminaires 1250 may comprise the LEDs 1252. The LEDs 1252 may comprise different colors of LEDs (such as red, green, and blue) that can combine to generate different color temperatures. Note that some embodiments use more than three different color LEDs 1252.

Figure 1D:
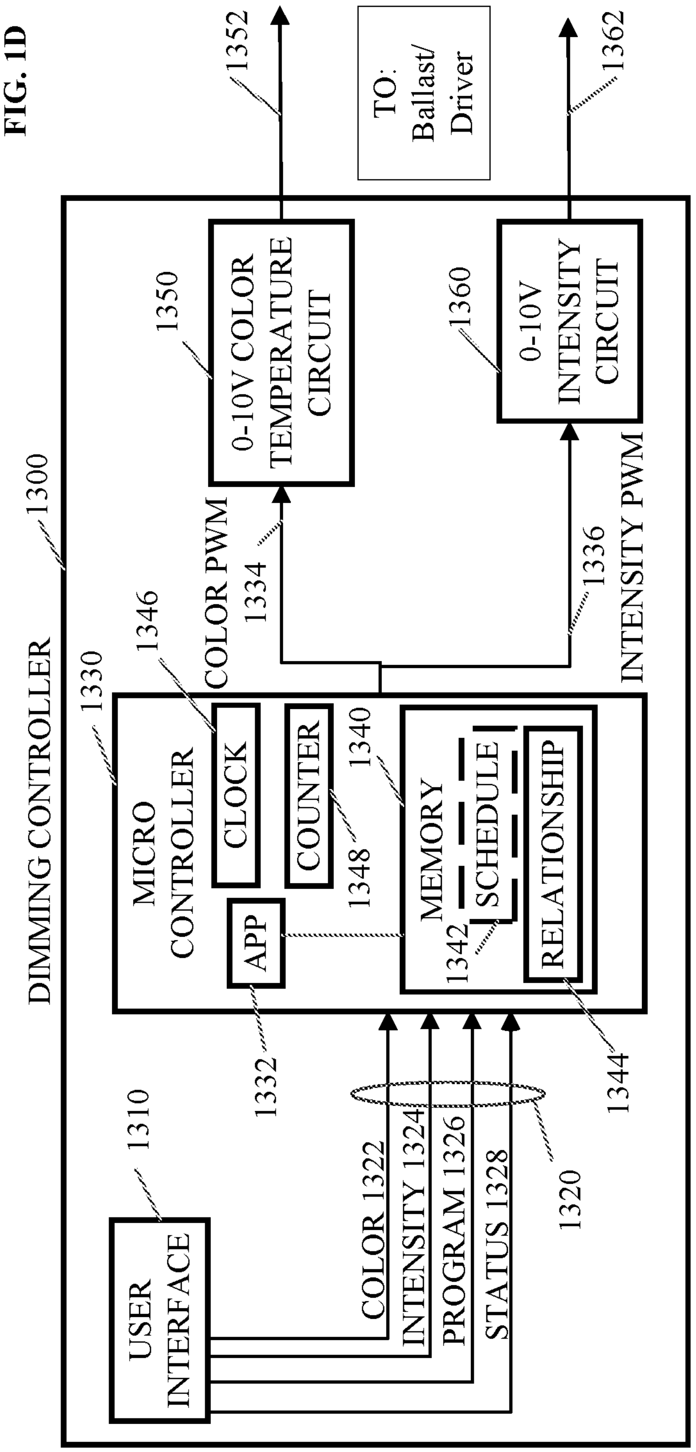
FIG. 1D illustrates an embodiment of a dimming controller for the switch in FIG. 1A.

FIG. 1D illustrates an embodiment of a dimming controller for a switch such as the dimming controller 1026 in the switch 1020 in FIG. 1A. The dimming controller 1300 may comprise a user interface 1310, a memory 1340, a microcontroller 1330, a 0-10V color temperature circuit 1350, and a 0-10V intensity circuit 1360 to generate first and second control signals 1352 and 1362, respectively. The first and second control signals 1352 and 1362 may control multiple attributes of a load based on a single user input via a user input device such as the user input device 1024 in FIG. 1A.

The user interface 1310 may receive input signals from a user input device such as a capacitive touch switch, a proximity sensor, a slide switch, a potentiometer, a rocker switch, a biometric switch, or the like. Activation of the user input device may comprise an input from a user to change the intensity PWM control signal 1336 and the color PWM control signal 1334. The microcontroller 1330 may receive the user input as an intensity 1324 and may determine, based on an application executing on the microcontroller 1330, whether to respond by changing the intensity PWM 1336 control signal, changing the color PWM 1334 control signal, or changing both PWM control signals.

The application 1332 may reference the relationship 1344 to determine whether to respond to the user input from the user input device by changing the intensity PWM 1336 control signal, changing the color PWM 1334 control signal, or changing both PWM control signals. For instance, the user may create a program that relates the activation of the user input device with a change in the color temperature of a corresponding luminaire. In such embodiments, the relationship may or may not indicate changes in the intensity level of the light emitted the luminaire responsive to the changes in the color temperature of the luminaire.

The user interface 1310 may also provide input from a processing device such as the processing device 1010 in FIG. 1A via a wireless communication interface such as the communication interface 1028 in FIG. 1A. The processing device may provide an instruction from the user to set the intensity to a specific level and/or to set a color temperature to a specific temperature or color. The processing device may also provide a program 1326 for the microcontroller 1330 in the form of a schedule 1342 and the relationship 1344. The status 1328 signal may indicate when a program 1326 is being transmitted to the microcontroller 1330 as well as when the program 1326 transmission is complete.

The schedule 1342 may comprise one or more events. The events relate to a time or a sensor and may comprise one or more triggers and one or more associated actions to, e.g., change the intensity PWM 1336 control signal, change the color PWM 1334 control signal, or change both PWM control signals. The triggers may be based on a setting for a time event such as a time of day such as 3 μm, sunrise, sunset, and/or the like and may also include other triggers associated with notifications such as emails or text, detections by one or more local or remote sensors such as input from the user input device In some embodiments, the event programming defaults to an immediate trigger based on the time selected for the event unless another trigger is selected. In one embodiment, only an immediate and/or time delayed trigger are available. Furthermore, the relationship 1344 may relate the intensity level, the color temperature, and the user input from the user input device.

The application 1332 may monitor clock circuitry 1346 of the microcontroller 1330 or set a counter in counter circuitry 1348 and monitor for expiration of the counter to implement events based on the time of day and/or other trigger. The application 1332 may also enforce the relationship 1344 for activations of the user input device and, in some embodiments, for changes in the intensity and/or color temperature identified in the schedule 1342 or received from the processing device. In other embodiments, the changes in the intensity and/or color temperature identified in the schedule 1342 or received from the processing device override the relationship 1344.

In some embodiments, the clock circuitry 1346 and/or the counter circuitry 1348 may comprise an integrated chip that is part of the chip package of the microcontroller 1330 or on the same die as, or common die with, the microcontroller 1330. In other embodiments, the clock circuitry 1346 and/or the counter circuitry 1348 may comprise an integrated chip and/or discrete components that are distinct from (not included in) the chip package of the microcontroller 1330. In still other embodiments, the clock circuitry 1346 and/or the counter circuitry 1348 may be partially located in the microcontroller 1330 chip package and partially outside of the microcontroller 1330 chip package.

The clock circuitry 1346 and/or counter circuitry 1348 may include one or more circuits to maintain a time of day, day of week, week of month, month of year, and/or year. In some embodiments, the clock circuitry 1346 and/or the counter circuitry 1348 may maintain calendar events such as sunrise and sunset times, moon phases, other astronomical information, and/or the like. In further embodiments, the application 1332 may access information such as sunrise and sunset times, moon phases, other astronomical information, and/or the like via the user interface 1310 and/or via a wireless network such as a wireless gateway to an Internet connection.

In some embodiments, the clock circuitry 1346 may generate clock pulses to measure time and/or maintain synchronization of circuitry. In further embodiments, the counter circuitry 1348 may include one or more counters that count up or down to measure a passage of time and/or to identify times associated with one or more events. For instance, the clock circuitry 1346 and/or the counter circuitry 1348 may identify the rise and fall of pulses of the color PWM 1334 control signal and the intensity PWM 1336 control signal.

In some embodiments, the intensity PWM 1336 control signal and the color PWM 1334 control signal provided at output pins of the microcontroller 1330 may vary with a smaller voltage range than the desirable voltage range for the ballast or luminaire so the 0-10V intensity circuit 1360 may increase the voltage of the intensity PWM 1336 control signal with, e.g., 3 VDC pulses to 10 VDC pulses in the first control signal 1362 such as the first control signal discussed in conjunction with FIG. 1A. Similarly, the 0-10V color temperature circuit 1350 may convert the color PWM 1334 control signal with, e.g., 3 VDC pulses to 10 VDC pulses in the second control signal 1352 such as the second control signal discussed in conjunction with FIG. 1A. Note that while several embodiments herein may discuss 0-10V control signals to provide to the luminaires, other embodiments accommodate different voltage PWM control signals in a similar manner.

The memory 1340 may include volatile and non-volatile memory such as random-access memory (RAM) and flash memory, respectively. In many embodiments, the application 1332 and the program including the schedule and the relationship are stored in non-volatile memory. Portions of or all the code of the application 1332 may be stored in volatile memory during execution.

FIGS. 1E-F illustrate embodiments of data structures 1400 and 1500 for schedules in a processing device such as the processing device 1010 in FIG. 1A and a schedule with relationships in a switch, respectively, such as the switch 1020 in FIG. 1A. FIG. 1E illustrates the data structure 1400 in which the user may generate schedules for more than one switches. Each row in the data structure 1400 depicts an event entry. The event entry may include event programming for the associated event. Each event that the user generates may include a switch identifier (ID) to identify the particular switch or group of switches associated with the event. For instance, the switch ID may be associated with a single switch or may be associated with a group of switches.

For each event, the event entry may comprise event programming to associate a state of the switch, i.e., a state in which the load powered on or a state in which the load is powered off. If the load is a luminaire and the state of the load is powered on, the event entry may include event programming for one or more actions to set an intensity level, a color temperature, and, in some embodiments, a relationship. In some embodiments, the data structure 1400 may also include a schedule ID and/or a profile ID to identify or distinguish different schedules and profiles. In further embodiments, one or more of the event entries in the data structure 1400 may include event programming to define one or more triggers such as the sensor predicate 1174, immediate 1188, timed 1190, delayed 1192, lack of detection 1194, and multiple detection 1196 triggers discussed in conjunction with FIG. 1B.

FIG. 1F illustrates a schedule of events for a specific switch or a group of switches that include one or more luminaires. Each event may include a state of the switch(es) as being powered on or being powered off. If the load is a luminaire and the state of the load is powered on, the event entry may include event programming for one or more actions to set an intensity level, a color temperature, and, in some embodiments, a relationship. In other embodiments, the program for a switch may include s single relationship by which a user input device can generate control signals for two or more attributes of the load with a single user input. In some embodiments, the data structure 1500 may also include a schedule ID and/or a profile ID to identify or distinguish different schedules and profiles. In further embodiments, one or more of the event entries in the data structure 1500 may include event programming to define one or more triggers such as the sensor predicate 1174, immediate 1188, timed 1190, delayed 1192, lack of detection 1194, and multiple detection 1196 triggers discussed in conjunction with FIG. 1B.

FIG. 1G illustrates an embodiment 1600 of a first control signal 1610, a second control signal 1620, and a third control signal 1630 generated by a switch such as the switch 1020 in FIG. 1A. The switch may generate the control signals at a constant frequency defined by the period 1602. The frequency is one cycle divided by the period in seconds to create a frequency of, e.g., 120 cycles per second or greater.

The embodiment 1600 illustrates the occurrence of three events 1640, 1650, and 1660 triggered at times coinciding with the start of three different periods 1602. At event 1640 the first control signal 1610 is set to a pulse-width (PW) or duty cycle of 46% of the period 1602. The duty cycle of 46% means that a pulse voltage is maintained for 46% of the period 1602 and there will be no pulse for the remainder of the period 1602. For instance, if the first control signal 1610 determines the intensity level of a luminaire, the luminaire will be powered on for 46% of the period 1602 and powered off for 54% of the period 1602.

At event 1640, the second control signal 1620 is set to a PWM or duty cycle of 66%. The duty cycle of 66% means that a pulse voltage will be maintained for 66% of the period 1602 and there will be no voltage pulse for the remaining 34% of the period 1602.

At event 1640, the third control signal 1630 is set to a PWM or duty cycle of 26%. The duty cycle of 26% means that a pulse voltage will be maintained for 26% of the period 1602 and there will be no voltage pulse for the remaining 74% of the period 1602. Furthermore, the relationship of the third control signal 1630 to the first control signal 1610 is that the PW of the third control signal 1630 is 20% less of the duty cycle than the PW of the first control signal 1610. Similarly, the PW of the second control signal 1620 is 20% more than the PW of the first control signal 1610 or 40% more than the PW of the third control signal 1630.

At event 1650, the duty cycle of each of the control signals 1610, 1620, and 1630 are set to a duty cycle of 50%. The duty cycle of 50% means that a pulse voltage will be maintained for half of the period 1602 and there will be no voltage pulse for the remaining half of the period 1602.

At event 1660, the duty cycle of the first control signal 1610 is set to 30%, the duty cycle of the second control signal 1620 is set to 20%, the duty cycle of the third control signal 1630 is set to 10%. The duty cycle of 30% means that a pulse voltage will be maintained for 30% of the period 1602 and there will be no voltage pulse for the remaining 70% of the period 1602. The duty cycle of 20% means that a pulse voltage will be maintained for 20% of the period 1602 and there will be no voltage pulse for the remaining 80% of the period 1602. The duty cycle of 10% means that a pulse voltage will be maintained for 10% of the period 1602 and there will be no voltage pulse for the remaining 90% of the period 1602.

Figure 2:
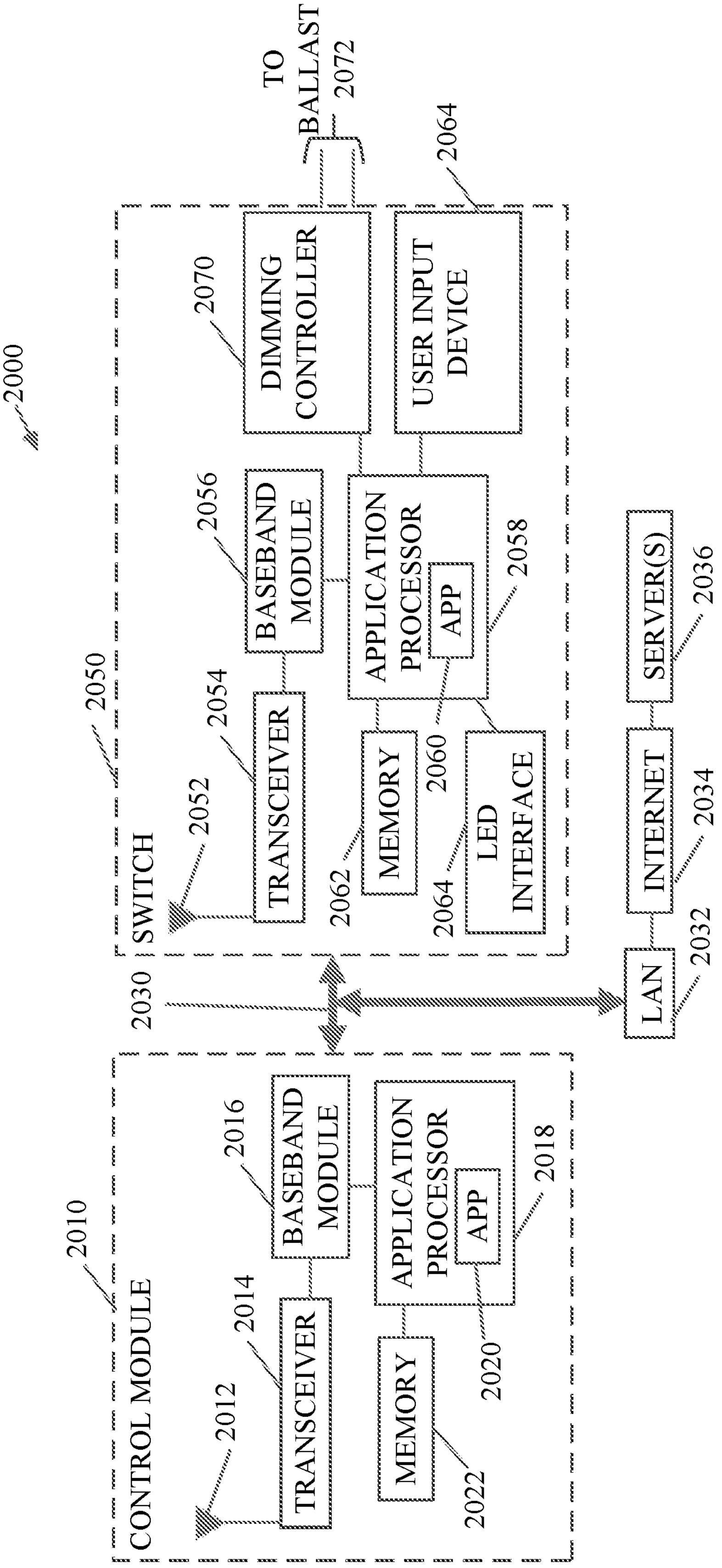
FIG. 2 illustrates another embodiment of a processing device and a switch such as the processing device and the switch in FIG. 1A.

FIG. 2 illustrates another embodiment 2000 of a control module 2010 and a switch 2050 such as the control module 1040 and the switch 1020 in FIG. 1A. In the present embodiment, the user may create a schedule of events for the switch 2050 and transmit the schedule of events to the control module 2010. The control module 2010 may maintain schedules for one or more electrical devices such as the switch 2050 and transmit instructions to the switch 2050 to change the control signals transmitted to the ballast 2072 based on the occurrence (triggering of) events associated with the switch 2050.

The control module 2050 may include a wireless communications interface comprising an antenna or antenna array 2012, a transceiver 2014, and a baseband module 2016. The control module 2010 may also comprise an application processor 2018 and memory 2002 coupled with the application processor 2020. The wireless communications interface may include interfaces for communicating with local or remote devices or networks through one or more wireless communication technologies.

The control module 2010 may receive a program for the switch 2050 from a processing device and the program may be a schedule that includes a series of events or scenes. The control module 2010 may receive the program as a series of packets via the antenna 2012. The transceiver 2014 may convert the time domain signal into a series of frequency domain symbols of a physical layer packets and the baseband module 2016 may interpret and combine information in the packets as necessary to form application layer packets. The baseband module 2016 may pass the application layer packets to the application 2020 in the application processor 2018 and the application processor 2018 may parse the application layer packets to obtain the program. The application processor 2018 may also store the program in the memory 2022.

The application 2020 may execute on the application processor 2018 to monitor events in the program to determine when to trigger the actions associated with the events such as changes to the control signals transmitted to the ballast 2072. In some embodiments, the program includes a relationship to relate user input received via the user input device 2064 of the switch 2050 with settings for or changes to the control signals transmitted to the ballast 2072. In several embodiments, the control module 2010 may transmit a relationship to the switch 2050 to store locally. The relationship may describe an association between user input via the user input device 2064 and the control signals output to the ballast 2072.

The control module 2010 may transmit the relationship wirelessly through a wireless channel 2030 to the switch 2050 and the antenna or antenna array 2052 of the switch 2050 may receive the relationship. A transceiver 2054 may process a physical layer signal with the relationship and may pass the relationship to the baseband module 2056 for further processing prior to passing the relationship to an application 2060 executing on the application processor 2058. The application processor 2058 may store the relationship in memory 2062.

In some embodiments, the control module 2010 may also wirelessly connect to one or more cloud services servers 2036 via a local area network 2032 and the Internet 2034. For instance, the control module 2010 may couple with the cloud services servers 2036 to obtain information such as stock prices and commodity prices, to receive notifications related to events in the program for the switch 2050, and/or the like.

The switch 2050 may comprise the user input device 2064 and a dimming controller 2070. The user input device 2064 may comprise any type of device that can receive user input to, e.g., dim one or more luminaires coupled with the switch 2050 via a ballast and the dimming controller 2070. In response to receipt of input from the user input device, the application processor 2058 may transmit a signal to the dimming controller 2070 to adjust an intensity level of luminaires coupled with the switch 2050 through the dimming controller 2070. In several embodiments, based on the relationship provided by the control modules 2010, the application processor 2058 may also provide a signal to the dimming controller 2070 to adjust the color temperature of luminaires connected to the dimming controller 2070. For instance, the relationship may comprise a linear or non-linear mathematical relation between the intensity level of a control signal transmitted to a luminaire and a color temperature indicated by a control signal transmitted to the luminaire. The application processor 2058 may determine the adjustment to the color temperature corresponding to the adjustment indicated by the user input via the user input device 2064 and may transmit signal to the dimming controller 2070 to make the adjustment to the color temperature control signal.

In some embodiments, the user may create a relationship that changes the function for the user input device 2064 from an intensity adjustment device to a color temperature switch. In such embodiments, the application processor 2058 may determine changes to the color temperature based on the user input and may determine corresponding changes to the intensity level. The application processor 2058 may then output signals to indicate the changes to the color temperature and the intensity level of the luminaire to the dimming controller 2070.

The dimming controller 2070 may generate, based on input from the application processor 2058, control signals to the ballast 2072 to implement changes to the intensity level and color temperature of one or more luminaires coupled with the dimmer controller 2070 based on a single input via the user input device 2064. The dimming controller 2070 may also receive adjustments to the intensity level and/or color temperature from the control module 2010 via the application processor 2058 based on the occurrence (triggering) of events in a program being executed by the control module 2010.

In several embodiments, the switch 2050 may include a light emitting diode (LED) interface 2064. The LED interface 206 may include one or more LEDs. The LED interface 2064 may provide and adjust a visual display based on an operational state of the switch 2050 (e.g., to indicate processing of a command, powering up, powering off, etc.). The LED interface 2064 may provide a way for communicating information to the user visually by adjusting the visual state of any LEDs coupled thereto. As an example, the LED interface 2064 may provide a "connected" indicator to indicate that the switch 2050 successfully connected wirelessly with the control module 2010 or a processing device.

The memory 2062 may store one or more programs for execution by the application processor 2058 to implement one or more functions or features of the system 2000 as described herein. The application processor 2058 may be implemented using any processor or logic device including a microcontroller or other processing circuitry. The memory 2062 may be implemented using any machine-readable or computer-readable media capable of storing data, including both volatile and non-volatile memory, and may reside internal or external to the system 2000.

One or more of the components depicted in FIG. 2 may be provided on a printed circuit board (PCB) including, for example, the application processor 2058, the memory 2062, the antenna or antenna array 2052, the transceiver 2054, the baseband module 2056, the dimming controller 2070 and the user input device 2064. The PCB may be implemented in any manner including as a rigid PCB, a flexible PCB, a thermo-formed PCB, etc.

Figure 3A:
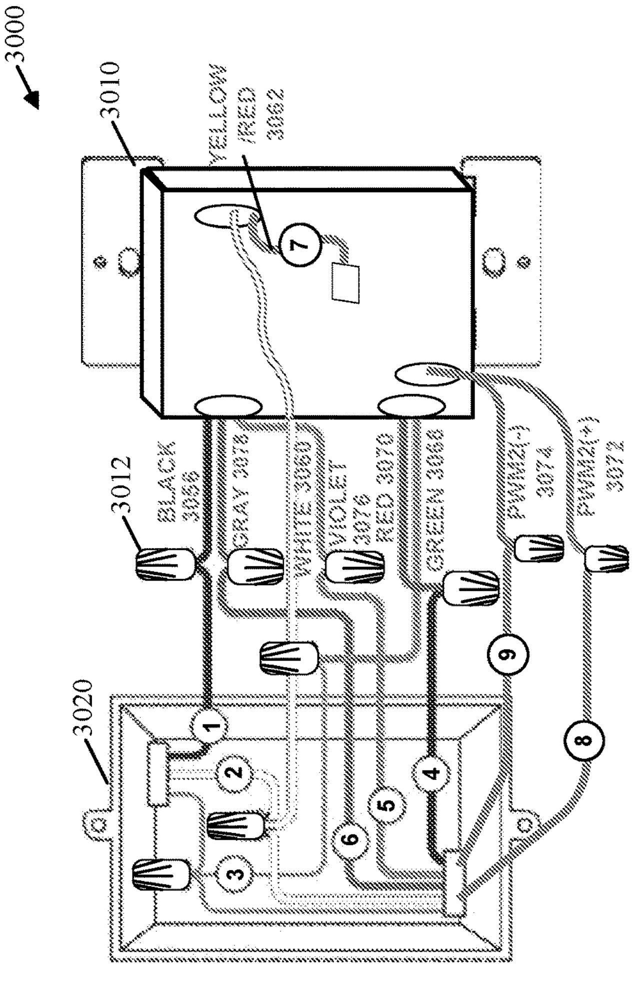
FIGS. 3A-B illustrates embodiments of wiring diagrams for the switch in the system of FIG. 1A.
Figure 3B:
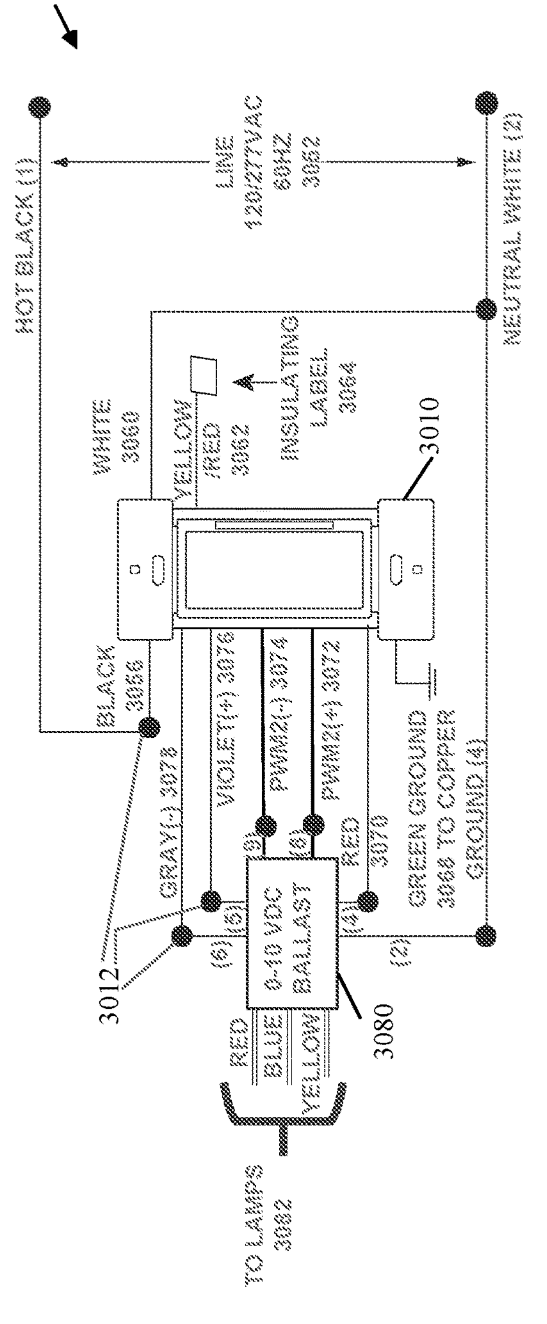

FIGS. 3A-B illustrate embodiments of wiring diagrams 3000 and 3050 for the switch 3010 such as the switch 1020 in the system 1000 of FIG. 1A. FIG. 3A illustrates an embodiment of a form of the switch 3010 and the electrical junction box 3020 in which the switch 3010 may be installed. Note that the electrical junction box 3020 is a single-gang box in this embodiment, but embodiments are not so limited. The switch 3010 may be installed in any junction box such as a double-gang box, a triple-gang box, a quadruple-gang box, a five-gang box, and/or the like.

The wiring diagrams 3000 and 3050 depict wire nuts 3012 to interconnect the wires of the switch 3010 to the wires at the junction box 3020 including a black wire 3056 from the switch 3010 to connect with a line voltage wire (1) from the junction box 3020. A gray wire 3078 and a violet wire 3076 may comprise control signal wires output from a dimming controller of the switch 3010 to indicate an intensity level to the 0-10 VDC ballast 3080. The PWM2(−) 3074 and PWM2 (+) 3072 wires may comprise control signal wires output from a dimming controller of the switch 3010 to indicate a color temperature to the 0-10 VDC ballast 3080. The green 3068 wire from the switch 3010 may couple with a green or bare copper ground wire in the electrical junction box 3020 to provide grounding for the switch 3010. The white 3060 wire from the switch 3010 may couple with the white neutral wire (2) from the electrical junction box and the white neutral wire (2) for the 0-10 VDC ballast 3080 to provide 120 VAC at 60 Hz 3052 to the switch and the 0-10 VDC ballast 3080. Furthermore, the red 3070 wire is the output from the switch 3010 to the 0-10 VDC ballast 3080 to provide the 120 VAC when the switch 3010 connects the circuit from the black 3056 wire to the red 3070 wire to the 0-10 VDC ballast 3080 and disconnects the 0-10 VDC ballast 3080 from power when the switch 3010 disconnects the black 3056 wire from the red 3070 wire.

The yellow/red 3062 wire is insulated in the present embodiment because it is not being used when the switch 3010 is wired as a single pole switch. In other embodiments, when the switch 3010 is wired as a 3-way switch, the yellow/red 3062 wire may couple with the second switch to interconnect the switches to facilitate use of either of the switches to connect or disconnect power from the 0-10 VDC ballast 3080. The 0-10 VDC ballast 3080 may output control signals to the lamps or luminaires 3082.

Figure 4A:
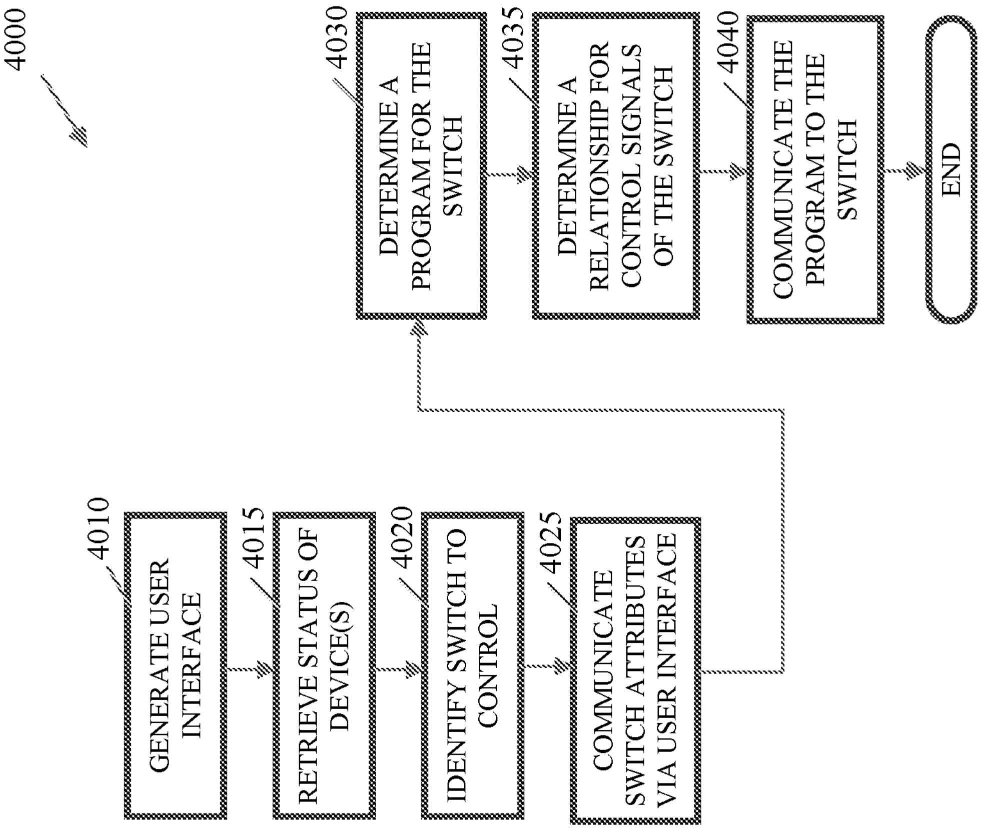
FIG. 4A illustrates an embodiment of a flowchart for the application for execution in a processing device such as the application in the processing device in FIG. 1A.

FIG. 4A illustrates an embodiment 4000 of a flowchart for the application for execution in a processing device such as the application 1012 in the processing device 1010 in FIG.

1A and the user interfaces illustrated in FIG. 1B. The flowchart begins at element 4010 with generating a user interface. Generating the user interface may involve displaying a graphical display to present a list of devices paired with or associated with the processing device and, in some embodiments, a list of devices that are available to pair or associate with the processing device but have not yet been paired or associated with the processing device.

At element 4015, the processing device may retrieve the status of the paired or associated devices. The status of the paired or associated devices may include, e.g., whether the devices include a switch that is on, a closed circuit between a power source and a load or off, an open circuit between a power source and a load. The status may also include other information such as the intensity level set for a luminaire connected to the paired device, a color temperature of a light source connected to the paired device, a relationship associated with a user input device of the paired device, a name or ID associated with the paired device, and/or the like.

At element 4020, the processing device may receive as input from a user, a selection or identification of a switch to control or edit via the user interface. For instance, the user may tap on a touch screen of the processing device at the display of a first switch to select the first switch to control or edit.

At element 4025, the processing device may communicate switch attributes to a user via a user interface. In many embodiments, the processing device may switch the display to a second user interface that displays detailed information about the switch selected by the user. For instance, the second user interface may indicate the name or location of the switch, the status of the power applied to the load as powered or not powered, an intensity level output by the switch, a color temperature output by the switch, and a relationship between the intensity level, the color temperature, and a user input from the user input device. In some embodiments, the user interface may also provide selectable items to allow the user to enter other user interfaces such as a device schedule user interface to facilitate programing the switch by the user.

At element 4030, the user advances to the device schedule user interface and begins to generate or determine a program for the switch. For instance, the device schedule user interface may allow the user to edit, add, or remove events associated with a schedule for the switch. The events may include event programming for a trigger based on a time of day, one or more days of the week, a sensor detection, a lack of detection by a sensor, and/or the like. Adding, deleting, and/or editing an event changes the program for the switch.

At element 4035, the user may interact with the user interface for the switch to determine a relationship between the control signals of the switch and the user input device of the switch. For example, the user may select a first control signal that the user input device may directly affect and set mathematical relationships between the user input from the user input device or the first control signal and the remaining one or more control signals. The relationship may identify a linear or non-linear relationship and some embodiments may allow the user to create more than one relationship. For instance, the user interface may facilitate generation of a different relationship for each scene or each event.

At element 4040, after the user interacts with the device to create the program, which includes a relationship and possibly one or more events, the processing device may transmit the program to the switch or a control module for implementation. For example, a control module may receive and execute programs for multiple switches by monitoring for the occurrence (triggering) of the events associated with each of the programs and transmitting actions to the switch(es) affected by the action(s) associated with each of the triggered events.

Figure 4B:
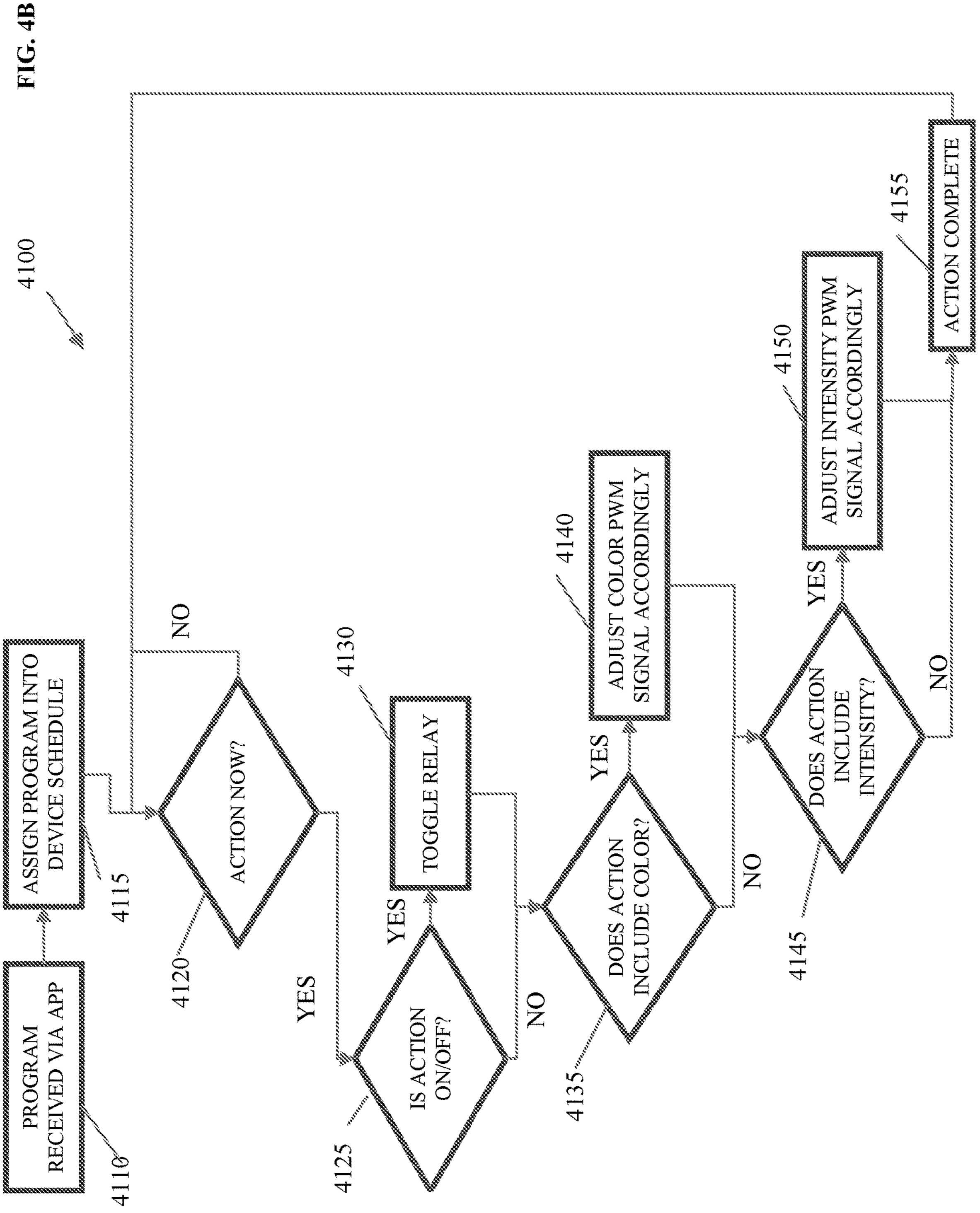
FIG. 4B illustrates an embodiment of a flowchart for the application for execution in a switch such as the application in the switch in FIG. 1A.

FIG. 4B illustrates an embodiment 4100 of a flowchart for an application for execution in a switch such as the application 1022 in the switch 1020 in FIG. 1A. The logic flow 400 may begin with element 4110 wherein a processing circuit receives a program for a switch. The processing circuit may comprise a processor such as a microcontroller of an intensity adjustment device, an application processor, or other processing circuitry either within the switch, attached to the switch, or in a control module configured to execute programs for one or more switches.

At element 4115, the processing circuit may assign the program into a device schedule for the associated switch. For instance, the processing circuit may incorporate the program into an existing device schedule that includes one or more other events or relationships. In other embodiments, the processing circuit may replace an existing program.

At element 4120, the processing circuit may monitor for the occurrence (triggering) of events in the device schedule. In some embodiments, the processing circuit may set up a countdown counter that expires at the next event and monitors the counter for expiration of the count. In other embodiments, the processing circuit may monitor a clock circuit for the occurrence of a time of day, monitor for receipt of a notification, monitor for a detection event by one or more sensors, and/or the like. When an event occurs, the processing circuit may advance to the element 4125.

At element 4125, the processing circuit may determine if the action involves a relay state of being on (closed circuit) or off (open circuit). If the action involves changing the current state of the relay, the processing circuit may toggle the relay at element 4130. For instance, toggling the relay may disconnect power from the load when the relay contacts coupled with the load are open or connect power to the load when the relay contacts coupled with the load are closed.

Note that, in some embodiments, the action to disconnect power from the load may end the action and thus skip to the element 4155 where the action is complete. In other embodiments, processing circuit may continue to process actions of the event, if any further actions are included in the program.

At element 4135, the processing circuit may determine if the action includes setting the color temperature of a second control signal. For instance, if the event includes setting an intensity level for luminaires and the includes a relationship between the intensity level and the color temperature, the processing circuit may set the color temperature of the second control signal based on the relationship and the intensity level setting. In other situations, the event may include a setting for the color temperature. In such cases, the processing circuit may adjust the color PWM signal accordingly at element 4140.

At element 4145, the processing circuit may determine if the action associated with the occurrence of the event includes setting the intensity level of the first control signal. If the actions include a setting for the intensity level or a relationship defines the intensity level based on a color temperature adjustment, the processing circuit may set the intensity level by adjusting the intensity PWM signal at element 4150. Thereafter the action associated with the event is complete and the processing circuit returns to monitoring for the occurrence of another event at element 4120.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

We claim:

1. A method comprising:

determining, by a controller, a first event from a set of events, the first event associated with a first trigger and a first action, the first action to transition an intensity level of a load;

determining, by the controller, to perform the first action associated with the first event in response to occurrence of the first trigger, wherein the first trigger comprises user input via a user input device of a switch coupled with the load;

generating, by the controller, a first control signal to represent the intensity level; and generating, by the controller, a second control signal based on a relationship between the first control signal and the second control signal, the second control signal to represent a color temperature based on the intensity level.

2. The method of claim 1, further comprising:

determining, by the controller, a second event from the set of events, the second event associated with a second trigger and a second action;

determining, by the controller, to perform the second action associated with the second event in response to occurrence of the second trigger, wherein the second trigger comprises a time of day and the second action comprises setting a second intensity level and a second color temperature for the load;

generating, by the controller, the first control signal based on the second intensity level; and generating, by the controller, the second control signal based on the second color temperature.

3. The method of claim 2, wherein the first event of the set of events is associated with receipt of input from a sensor, wherein performance of the first action is predicated on the receipt of the input from the sensor, wherein the user input device comprises the sensor.

4. The method of claim 3, wherein the second event of the set of events is associated with the second action and receipt of the input from the sensor, the receipt of the input comprising detection of a motion by a motion sensor.

5. The method of claim 1, wherein generating the first control signal based on the intensity level comprises adjusting a pulse width of the first control signal from a current pulse width to the pulse width based on the intensity level.

6. The method of claim 1, wherein generating the second control signal based on the color temperature further comprises generating a pulse width based on the color temperature.

7. The method of claim 1, wherein generating the first and second control signals comprises generating ten volt pulses having a duty cycle indicative of the intensity level and the color temperature, respectively.

8. A controller, comprising:

a user interface to receive input signals from a user input device;

a memory to store instructions, the instructions including a relationship between an intensity level and a color temperature;

a microcontroller in communication with the user interface, the microcontroller configured to execute the instructions to generate:

a first pulse-width modulation control signal to represent the intensity level of a luminaire; and a second pulse-width modulation control signal to represent the color temperature of the luminaire;

wherein the first and second pulse-width modulation control signals are based on the relationship.

9. The controller of claim 8, further comprising circuitry to generate a zero to ten volt pulse-width modulation control signal based on the first pulse-width modulation control signal, the second pulse-width modulation control signal, or both the first pulse-width modulation control signal and the second pulse-width modulation control signal.

10. The controller of claim 8, wherein the relationship comprises a linear or non-linear mathematical relation between the intensity level of the first pulse-width modulation control signal and the color temperature of the second pulse-width modulation control signal for the luminaire.

11. The controller of claim 8, wherein the memory comprises a schedule comprising one or more events, wherein at least one of the one or more events is associated with a different relationship between the intensity level of the first pulse-width modulation control signal and the color temperature of the second pulse-width modulation control signal.

12. The controller of claim 8, wherein the microcontroller is configured to set a duty cycle of the first pulse-width modulation control signal and the second pulse-width modulation control signal to apply power to the luminaire or disconnect power from the luminaire.

13. The controller of claim 8, wherein the intensity of the luminaire is related to the pulse width of the first pulse-width modulation control signal; and wherein the color temperature of the luminaire is related to the pulse width of the second pulse-width modulation control signal.

14. A non-transitory computer-readable medium comprising computer-readable code, the computer-readable code, when executed by a processor, perform operations comprising:

determining, by the processor, a first event from a set of events, the first event associated with a first trigger and a first action, the first action to transition an intensity level of a load;

determining, by the processor, to perform the first action associated with the first event in response to occurrence of the first trigger, wherein the first trigger comprises user input via a user input device of a switch coupled with the load;

generating, by the processor, a first control signal to represent the intensity level; and generating, by the processor, a second control signal based on a relationship between the first control signal and the second control signal, the second control signal to represent a color temperature based on the intensity level.

15. The computer-readable medium of claim 14, wherein the processor performs operations further comprising:

determining, by the processor, a second event from the set of events, the second event associated with a second trigger and a second action;

determining, by the processor, to perform the second action associated with the second event in response to occurrence of the second trigger, wherein the second trigger comprises a time of day and the second action comprises setting a second intensity level and a second color temperature for the load;

generating, by the processor, the first control signal based on the second intensity level; and generating, by the processor, the second control signal based on the second color temperature.

16. The computer-readable medium of claim 15, wherein the first event of the set of events is associated with receipt of input from a sensor, wherein performance of the first action is predicated on the receipt of the input from the sensor, wherein the user input device comprises the sensor.

17. The computer-readable medium of claim 16, wherein the second event of the set of events is associated with the second action and receipt of the input from the sensor, the receipt of the input comprising detection of a motion by a motion sensor.

18. The computer-readable medium of claim 14, wherein generating the first control signal based on the intensity level comprises adjusting a pulse width of the first control signal from a current pulse width to the pulse width based on the intensity level.

19. The computer-readable medium of claim 14, wherein generating the second control signal based on the color temperature further comprises generating a pulse width based on the color temperature.

20. The computer-readable medium of claim 14, wherein generating the first and second control signals comprises generating ten volt pulses having a duty cycle indicative of the intensity level and the color temperature, respectively.

* * * * *